US009287097B2

(12) United States Patent
Kuboi et al.

(10) Patent No.: US 9,287,097 B2
(45) Date of Patent: Mar. 15, 2016

(54) PREDICTING ULTRAVIOLET RAY DAMAGE WITH VISIBLE WAVELENGTH SPECTROSCOPY DURING A SEMICONDUCTOR MANUFACTURING PROCESS

(71) Applicant: Sony Corporation, Tokyo (JP)

(72) Inventors: Nobuyuki Kuboi, Kanagawa (JP); Tetsuya Tatsumi, Kanagawa (JP); Masanaga Fukasawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 653 days.

(21) Appl. No.: 13/675,751

(22) Filed: Nov. 13, 2012

(65) Prior Publication Data

US 2013/0133832 A1     May 30, 2013

(30) Foreign Application Priority Data

Nov. 30, 2011    (JP) ................................. 2011-262417
Nov. 30, 2011    (JP) ................................. 2011-262418

(51) Int. Cl.
    *H01J 37/32*        (2006.01)
    *H01L 21/3065*      (2006.01)
    *G06F 17/50*         (2006.01)
    *G01J 1/42*          (2006.01)

(52) U.S. Cl.
CPC ....... *H01J 37/32972* (2013.01); *G06F 17/5009* (2013.01); *H01J 37/32963* (2013.01); *H01L 21/3065* (2013.01); *G01J 1/429* (2013.01); *G06F 2217/16* (2013.01)

(58) Field of Classification Search
None
See application file for complete search history.

(56) References Cited

U.S. PATENT DOCUMENTS 5,014,217 A *   5/1991   Savage ............................ 702/28
5,658,423 A *   8/1997   Angell et al. ..................... 438/9

(Continued)

FOREIGN PATENT DOCUMENTS

JP       62-122130       6/1987
JP       2009-059879      3/2009
JP       2009-283838     12/2009

OTHER PUBLICATIONS

Jinnai, Butsurin, et al. "Prediction of UV Spectra and UV-radiation Damage in Actual Plasma Etching Processes Using On-Wafer Monitoring Technique" J. Applied Phys., vol. 107 (Feb. 2010).*

(Continued)

*Primary Examiner* — Kamini S Shah
*Assistant Examiner* — Jay B Hann
(74) *Attorney, Agent, or Firm* — Hazuki International, LLC

(57) ABSTRACT

The simulation method is for predicting a damage amount due to ultraviolet rays in manufacturing a semiconductor device. The method includes: calculating particle density by performing simulation based on a differential equation for the particle density; calculating emission intensity at each wavelength in a visible wavelength region based on the calculated particle density; obtaining an electron energy distribution function by comparing the calculated emission intensity at each wavelength in the visible wavelength region with an actually detected emission spectrum in the visible wavelength region with reference to information on emission species and an emission wavelength in a target manufacturing process; predicting an emission spectrum in an ultraviolet wavelength region by using the electron energy distribution function and a reaction cross-sectional area relating to the emission species; and predicting a damage amount due to the ultraviolet rays based on the predicted emission spectrum in the ultraviolet wavelength region.

14 Claims, 19 Drawing Sheets

(56) References Cited

U.S. PATENT DOCUMENTS

| | | | | |
|---|---|---|---|---|
| 7,297,287 | B2* | 11/2007 | Fatke et al. | 216/59 |
| 7,403,930 | B2* | 7/2008 | Ho | 706/20 |
| 8,193,007 | B1* | 6/2012 | Madriaga et al. | 438/14 |
| 8,877,080 | B2* | 11/2014 | Chen et al. | 216/60 |
| 8,924,001 | B2* | 12/2014 | Morisawa et al. | 700/121 |
| 2010/0243431 | A1* | 9/2010 | Kuboi et al. | 703/6 |
| 2013/0013253 | A1* | 1/2013 | Samukawa et al. | 702/167 |

OTHER PUBLICATIONS

Hong, Sang Jeen & May, Gary S. "Neural Network-Based Real-Time Malfunction Diagnosis of Reactive Ion Etching Using In Situ Metrology Data" IEEE Transactions on Semiconductor Manufacturing, vol. 17, No. 3 (2004).*

Yang, Ryan & Chen, Rongshun "Real-Time Plasma Process Condition Sensing and Abnormal Process Detection" Sensors, vol. 10, pp. 5703-5723 (2010).*

Anderson, Harold M. "Plasma Diagnostics for Semiconductor Processing" IEEE (2000).*

Orlikovskii, A.A. & Rudenko, K.V. "In Situ Diagnostics of Plasma Processes in Microelectronics: The Current Status and Immediate Prospects" Russian Microelectronics, vol. 30, No. 2, pp. 69-87 (2001).*

* cited by examiner

PREDICTING ULTRAVIOLET RAY DAMAGE WITH VISIBLE WAVELENGTH SPECTROSCOPY DURING A SEMICONDUCTOR MANUFACTURING PROCESS

BACKGROUND

The present disclosure relates to a simulation method and a simulation program for predicting the amount of damage due to ultraviolet rays in manufacturing a semiconductor device. In addition, the present disclosure relates to a semiconductor manufacturing apparatus which predicts the amount of damage due to ultraviolet rays and controls process conditions.

In manufacturing a semiconductor device, a process using plasma generated by high-frequency bias application has been widely performed.

In the plasma, collision of particles and interactive reactions with a chamber wall occur, and ions, radicals, and light are generated, in accordance with a structure of a process chamber and process conditions.

In relation to technical development for predicting and controlling damage to a film (crystal defects) caused when film is irradiated with ions, various techniques such as simulation methods, process methods, and apparatus configurations have been proposed.

In addition to the damage caused by the ions, there has been a concern regarding damage to the film due to light emitted from the plasma, particularly ultraviolet rays, namely ultraviolet (UV) and vacuum-ultraviolet (VUV) in recent years. Basic studies and monitoring techniques relating to the damage to the film due to the ultraviolet rays emitted from plasma have been domestically and internationally intensified.

Since semiconductor devices have decreased in thickness, and organic semiconductor devices and compound semiconductor devices have been widely developed recently, it has become desirable to develop techniques for predicting emission intensity in the ultraviolet wavelength region and quantitatively predict and control damage caused by ultraviolet rays.

For this reason, some methods for monitoring the ultraviolet rays and methods for predicting the amount of damage due to the ultraviolet rays in manufacturing a semiconductor device have been proposed in the related art.

For example, a method in which a sensor configured by layers of a silicon film and an oxide film is installed in a wafer or on a top panel of a plasma chamber to detect a hole generated by the ultraviolet rays incident on the sensor as induced current under application of negative bias has been proposed (see Japanese Unexamined Patent Application Publication Nos. 2009-283838 and 2009-59879).

By measuring variations in the induced current during a plasma process, it is possible to monitor the total ultraviolet (not dispersed) intensity in real time. In addition, the amount of damage is predicted while the ultraviolet intensity is used as an index.

In addition, a method for monitoring the ultraviolet rays emitted from an ultraviolet light in an ultraviolet cleaning apparatus for removing organic substances has been proposed (see Japanese Unexamined Patent Application Publication No. 62-122130).

Although ultraviolet rays with a wavelength of 254 nm are used for cleaning, there is a problem in that a sensor immediately deteriorates due to high emission intensity if monitoring is performed directly.

For this reason, in the proposed method, variations in the intensity at a wavelength of 254 nm, which is originally desired to be detected, are predicted without directly monitoring the wavelength of 254 nm, by monitoring as a reference an ultraviolet intensity at 313 nm, which is correlated with the wavelength of 254 nm and is of a lower intensity.

SUMMARY

However, damage to the film due to irradiation of the ultraviolet rays is related with a band gap between the wavelength of the emitted ultraviolet rays and the target film.

In a case of silicon (the band gap is 1.12 eV), for example, when ultraviolet rays (with energy of 4 eV or more and a wavelength of shorter than 310 nm) is made to be incident, absorption occurs over the entire ultraviolet wavelength, and crystalline defects are caused.

In a case of $SiO_2$ (8.95 eV: 139 nm) or SiN (5.1 eV: 243 nm), the band gap is larger than that of silicon, and therefore, the degree of absorption and amount of damage greatly differ depending on the wavelength band even at a wavelength which is shorter than 310 nm.

Accordingly, the amount of damage to silicon greatly differs depending on a configuration, a thickness, and further an irradiation wavelength of a film above silicon.

In addition, since emission spectrum distribution also differs depending on the process conditions used, it is important to disperse light from ultraviolet (UV) to vacuum-ultraviolet (VUV) for practical use in manufacturing a semiconductor device.

Moreover, it can be considered that various wavelengths in the ultraviolet wavelength region are related to the damage in the plasma process when actually manufacturing a semiconductor device.

According to the methods disclosed in Japanese Unexamined Patent Application Publication Nos. 2009-283838 and 2009-59879, however, the total amount of the ultraviolet rays is monitored while an intensity at each wavelength is not monitored (dispersed). For this reason, the amount of damage is neither correctly predicted nor controlled.

According to the method disclosed in Japanese Unexamined Patent Application Publication No. 62-122130, attention is paid only to two specific wavelengths in a pinpoint manner, and therefore, the amount of damage is neither correctly predicted nor controlled.

It is desired to provide a simulation method and simulation which make it possible to correctly predict the amount of damage to a film due to the ultraviolet rays. In addition, it is desired to provide a semiconductor manufacturing apparatus capable of predicting the amount of damage to a film due to the ultraviolet rays and controlling the amount of damage.

According to an embodiment of the present disclosure, there is provided a simulation method for predicting a damage amount due to ultraviolet rays in manufacturing a semiconductor device.

First, particle density is calculated by performing simulation based on a differential equation for the particle density, and emission intensity at each wavelength in a visible wavelength region is calculated based on the calculated particle density.

Then, an electron energy distribution function is obtained by comparing the calculated emission intensity at each wavelength in the visible wavelength region with an actually detected emission spectrum in the visible wavelength region with reference to information on emission species and an emission wavelength in a target manufacturing process.

Furthermore, an emission spectrum in an ultraviolet wavelength region is predicted by calculating emission intensity at each wavelength in the ultraviolet wavelength region by using the electron energy distribution function and a reaction cross-sectional area relating to the emission species, and the damage amount due to the ultraviolet rays is predicted based on the predicted emission spectrum in the ultraviolet wavelength region.

According to another embodiment of the present disclosure, there is provided a simulation program for predicting a damage amount due to ultraviolet rays in manufacturing a semiconductor device.

First, particle density is calculated by performing simulation based on a differential equation for the particle density, and emission intensity at each wavelength in a visible wavelength region is calculated based on the calculated particle density.

Then, an electron energy distribution function is obtained by comparing the calculated emission intensity at each wavelength in the visible wavelength region with an actually detected emission spectrum in the visible wavelength region with reference to information on emission species and an emission wavelength in a target manufacturing process.

Furthermore, an emission spectrum in an ultraviolet wavelength region is predicted by calculating emission intensity at each wavelength in the ultraviolet wavelength region by using the electron energy distribution function and a reaction cross-sectional area relating to the emission species, and the damage amount due to the ultraviolet rays is predicted based on the predicted emission spectrum in the ultraviolet wavelength region.

An information processing apparatus is caused to mount thereon and execute the above functions.

According to still another embodiment of the present disclosure, there is provided a semiconductor manufacturing apparatus including: a chamber in which a wafer is disposed; a sensor which detects an emission spectrum in a visible wavelength region inside the chamber; a calculation unit which calculates process conditions inside the chamber; and a control unit which controls process conditions inside the chamber.

The calculation unit calculates particle density by performing simulation based on a differential equation for the particle density and calculates emission intensity at each wavelength in a visible wavelength region based on the calculated particle density. Then, the calculation unit obtains an electron energy distribution function by comparing the calculated emission intensity at each wavelength in the visible wavelength region with an emission spectrum in the visible wavelength region, which has been actually detected with the sensor, with reference to information on emission species and an emission wavelength in a target manufacturing process. Furthermore, the calculation unit predicts an emission spectrum in an ultraviolet wavelength region by using the electron energy distribution function and a reaction cross-sectional area relating to the emission species. Then, the calculation unit predicts a damage amount due to the ultraviolet rays based on the predicted emission spectrum in the ultraviolet wavelength region and calculates the process conditions inside the chamber so as to minimize the damage amount.

The control unit controls process conditions inside the chamber so as to meet the process conditions which have been calculated by the calculation unit.

According to the aforementioned simulation method of the embodiment of the present disclosure, the electron energy distribution function is obtained by comparing the emission intensity at each wavelength in the visible wavelength region, which has been calculated based on the particle density, with the actually detected emission spectrum in the visible wavelength region. Furthermore, the emission spectrum in the ultraviolet wavelength region is predicted by calculating the emission intensity at each wavelength in the ultraviolet wavelength region by using the electron energy distribution function and the reaction cross-section area relating to the emission species. In so doing, it is possible to precisely predict the emission spectrum in the ultraviolet wavelength region.

Furthermore, since the damage amount due to the ultraviolet rays is predicted based on the predicted emission spectrum in the ultraviolet wavelength region, it is possible to precisely predict the emission intensity and the damage amount due to the ultraviolet rays in accordance with the wavelength of the emitted ultraviolet rays.

According to the aforementioned simulation program of the embodiment of the present disclosure, the electron energy distribution function is obtained by comparing the emission intensity at each wavelength in the visible wavelength region, which has been calculated based on the particle density, with the actually detected emission spectrum in the visible wavelength region. Furthermore, the emission spectrum in the ultraviolet wavelength region is predicted by calculating the emission intensity at each wavelength in the ultraviolet wavelength region by using the electron energy distribution function and the reaction cross-sectional area relating to the emission species. Moreover, the damage amount due to the ultraviolet rays is predicted based on the predicted emission spectrum in the ultraviolet wavelength region.

In so doing, it is possible to precisely predict an emission spectrum in the ultraviolet wavelength region and precisely predict the emission intensity and the damage amount due to the ultraviolet rays in accordance with the wavelength of the emitted ultraviolet rays.

According to the configuration of the aforementioned semiconductor manufacturing apparatus of the embodiment of the present disclosure, the calculation unit obtains the electron energy distribution function by comparing the emission intensity at each wavelength in the visible wavelength region, which has been calculated based on the particle density, with the actually detected emission spectrum in the visible wavelength region. Furthermore, the calculation unit predicts the emission spectrum in the ultraviolet wavelength region by calculating the emission intensity at each wavelength in the ultraviolet wavelength region by using the electron energy distribution function and the reaction cross-sectional area relating to the emission species. In so doing, it is possible to precisely predict the emission spectrum in the ultraviolet wavelength region.

In addition, the calculation unit predicts the damage amount due to the ultraviolet rays based on the predicted emission spectrum in the ultraviolet wavelength region. In so doing, it is possible to precisely predict the emission intensity and the damage amount due to the ultraviolet rays in accordance with the wavelength of the emitted ultraviolet rays.

Moreover, the calculation unit calculates the process conditions inside the chamber so as to minimize the damage amount, and the control unit controls process conditions inside the chamber so as to meet the process conditions which have been calculated by the calculation unit. In so doing, the process conditions inside the chamber are controlled so as to minimize the damage amount, and therefore, it is possible to reduce the damage amount due to the ultraviolet rays in manufacturing a semiconductor device.

According to still another embodiment of the present disclosure, there is provided a simulation method for predicting a damage amount due to ultraviolet rays in manufacturing a semiconductor device.

In addition, an equation for predicting emission intensity at each wavelength in an ultraviolet wavelength region, which has been associated with an emission spectrum in a visible wavelength region, is calculated based on multivariable analysis, and an emission spectrum in the ultraviolet wavelength region is predicted by using the calculated predicting equation and an actually detected emission spectrum in the visible wavelength region. Furthermore, a damage amount due to the ultraviolet rays is predicted based on the predicted emission spectrum in the ultraviolet wavelength region.

According to still another embodiment of the present disclosure, there is provided a simulation program for predicting a damage amount due to ultraviolet rays in manufacturing a semiconductor device.

First, an equation for predicting emission intensity at each wavelength in an ultraviolet wavelength region, which has been associated with an emission spectrum in a visible wavelength region, is calculated based on multivariable analysis. Then, an emission spectrum in the ultraviolet wavelength region is predicted by using the calculated predicting equation and an actually detected emission spectrum in the visible wavelength region. Furthermore, a damage amount due to the ultraviolet rays is predicted based on the predicted emission spectrum in the ultraviolet wavelength region.

An information processing apparatus is caused to mount thereon and execute the above functions.

According to still another embodiment of the present disclosure, there is provided a semiconductor manufacturing apparatus including: a chamber in which a wafer is disposed; a sensor which detects an emission spectrum in a visible wavelength region inside the chamber; a calculation unit which calculates process conditions inside the chamber; and a control unit which controls process conditions inside the chamber.

The calculation unit predicts an emission spectrum in the ultraviolet wavelength region by using an equation for predicting emission intensity at each wavelength in the ultraviolet wavelength region, which has been calculated based on multivariable analysis in association with an emission spectrum in a visible wavelength region, and an emission spectrum in the visible wavelength region, which has been actually detected with the sensor. Then, the calculation unit predicts a damage amount due to the ultraviolet rays based on the predicted emission spectrum in the ultraviolet wavelength region, and calculates the process conditions inside the chamber so as to minimize the damage amount.

The control unit controls process conditions inside the chamber so as to meet the process conditions which have been calculated by the calculation unit.

According to the aforementioned simulation method of the embodiment of the present disclosure, the equation for predicting the emission intensity at each wavelength in the ultraviolet wavelength region is calculated based on the multivariable analysis, and the emission spectrum in the ultraviolet wavelength region is predicted by using the predicting equation and the actually detected emission spectrum in the visible wavelength region. In so doing, it is possible to precisely predict the emission spectrum in the ultraviolet wavelength region.

Furthermore, the damage amount due to the ultraviolet rays is predicted based on the predicted emission spectrum in the ultraviolet wavelength region, and therefore, it is possible to precisely predict the emission intensity and the damage amount due to the ultraviolet rays in accordance with the wavelength of the emitted ultraviolet rays.

According to the aforementioned simulation program of the embodiment of the present disclosure, the equation for predicting the emission intensity at each wavelength in the ultraviolet wavelength region is calculated based on the multivariable analysis. Then, the emission spectrum in the ultraviolet wavelength region is predicted by using the predicting equation and the actually detected emission spectrum in the visible wavelength region. Furthermore, the damage amount due to the ultraviolet rays is predicted based on the predicted emission spectrum in the ultraviolet wavelength region.

In so doing, it is possible to precisely predict the emission spectrum in the ultraviolet wavelength region and precisely predict the emission intensity and the damage amount due to the ultraviolet rays in accordance with the wavelength of the emitted ultraviolet rays.

According to the aforementioned configuration of the semiconductor manufacturing apparatus of the embodiment of the present disclosure, the calculation unit predicts the emission spectrum in the ultraviolet wavelength region by using the equation for predicting the emission intensity at each wavelength in the ultraviolet wavelength region, which has been calculated based on the multivariable analysis, and the emission spectrum in the visible wavelength region, which has been actually detected with the sensor. In so doing, it is possible to precisely predict the emission spectrum in the ultraviolet wavelength region.

Then, the calculation unit predicts the damage amount due to the ultraviolet rays based on the predicted emission spectrum in the ultraviolet wavelength region. In so doing, it is possible to precisely predict the emission intensity and the damage amount due to the ultraviolet rays in accordance with the wavelength of the emitted ultraviolet rays.

Furthermore, the calculation unit calculates the process conditions inside the chamber so as to minimize the damage amount, and the control unit controls process conditions inside the chamber so as to meet the process conditions which have been calculated by the calculation unit. In so doing, the process conditions inside the chamber are controlled so as to minimize the damage amount, and therefore, it is possible to reduce the damage amount due to the ultraviolet rays in manufacturing a semiconductor device.

According to the aforementioned embodiments of the present disclosure, it is possible to correctly predict emission intensity and the amount of damage due to the ultraviolet rays in accordance with an ultraviolet wavelength to thereby effectively reduce transformation (damage) to each film due to the ultraviolet rays.

Accordingly, it is possible to manufacture a semiconductor device with less transformation (damage) due to the ultraviolet rays, which has a satisfactory property.

DETAILED DESCRIPTION OF EMBODIMENTS

Figure 1:
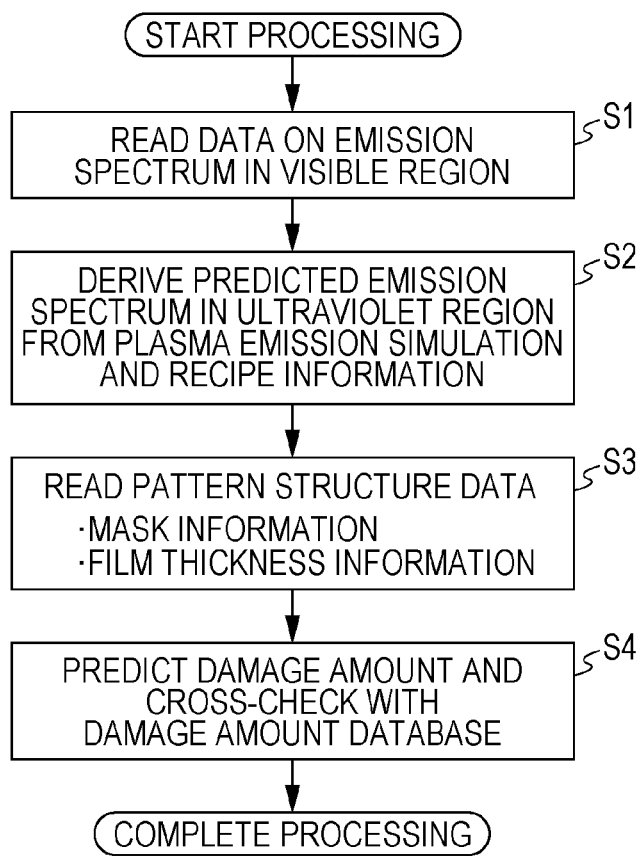
FIG. 1 is a basic flow diagram of a simulation method according to an embodiment of the present disclosure.

Hereinafter, description will be given of best modes (hereinafter, referred to as embodiments) for carrying out embodiments of the present disclosure.

In addition, the description will be given in the following order.
1. Outline of the Present Disclosure
2. First Embodiment (Simulation Method)
3. Second Embodiment (Simulator)
4. Third Embodiment (Dry Etching Apparatus)
5. Fourth Embodiment (Dry Etching Apparatus)
6. Fifth Embodiment (Dry Etching Apparatus and Method for Etching Process)
1. Outline of the Present Disclosure First, description will be given of an outline of the present disclosure prior to description of specific embodiments.

According to embodiments of the present disclosure, an ultraviolet emission spectrum is predicted by simulation based on data on a visible emission spectrum without directly monitoring ultraviolet light emission.

In addition, the amount of damage to a film is predicted by simulation using a result of prediction of the ultraviolet emission spectrum by the simulation as input information.

Moreover, a semiconductor manufacturing apparatus with software based on the aforementioned prediction method installed thereon is configured for the purpose of reducing damage due to the ultraviolet rays in real time.

According to embodiments of the present disclosure, a simulation method, a simulation program, and a semiconductor manufacturing apparatus are configured as follows.

The simulation method according to an embodiment of the present disclosure is a simulation method for predicting a damage amount due to the ultraviolet rays in manufacturing a semiconductor device.

First, simulation based on a differential equation for particle density is performed to calculate the particle density, and emission intensity at each wavelength in the visible wavelength region is calculated based on the calculated particle density.

Then, the calculated emission intensity at each wavelength in the visible wavelength region is compared with an actually detected emission spectrum in the visible wavelength region with reference to information on emission species and an emission wavelength in a target manufacturing process, and an electron energy distribution function is obtained.

The emission intensity at each wavelength in the ultraviolet wavelength region is calculated using the electron energy distribution function and a reaction cross-sectional area relating to the emission species to predict an emission spectrum in the ultraviolet wavelength region. Furthermore, a damage amount due to the ultraviolet rays is predicted based on the predicted emission spectrum in the ultraviolet wavelength region.

The simulation program according to an embodiment of the present disclosure is a simulation program for predicting a damage amount due to the ultraviolet rays in manufacturing a semiconductor device.

First, simulation based on a differential equation for a particle density is performed to calculate the particle density, and emission intensity at each wavelength in the visible wavelength region is calculated based on the calculated particle density.

Then, the calculated emission intensity at each wavelength in the visible wavelength region is compared with an actually detected emission spectrum in the visible wavelength region with reference to information on emission species and an emission wavelength in a target manufacturing process, and an electron energy distribution function is obtained.

Emission intensity at each wavelength in the ultraviolet wavelength region is calculated using the electron energy distribution function and a reaction cross-section area relating to the emission species, and an emission spectrum in the ultraviolet wavelength region is predicted. Furthermore, a damage amount due to the ultraviolet rays is predicted based on the predicted emission spectrum in the ultraviolet wavelength region.

Then, the program causes a computer to execute the above functions.

The semiconductor manufacturing apparatus according to an embodiment of the present disclosure includes a chamber with a wafer disposed therein, a sensor which detects an emission spectrum in the visible wavelength region in the chamber, a calculation unit which calculates process conditions in the chamber, and a control unit which controls the process conditions in the chamber.

The calculation unit performs simulation based on a differential equation for particle density to thereby calculate the particle density and calculates emission intensity at each wavelength in the visible wavelength region based on the calculated particle density. Then, the calculation unit compares the calculated emission intensity at each wavelength in the visible wavelength region with an emission spectrum in the visible wavelength region which has been actually detected with the sensor with reference to information on emission species and an emission wavelength in a target manufacturing process to thereby obtain an electron energy distribution function. Furthermore, the calculation unit predicts an emission spectrum in the ultraviolet wavelength region by using the electron energy distribution function and a reaction cross-sectional area relating to the emission species. Then, the calculation unit predicts a damage amount due to the ultraviolet rays from the predicted emission spectrum in the ultraviolet wavelength region and calculates the process conditions in the chamber so as to minimize a damage amount.

The control unit controls the process conditions in the chamber so as to satisfy the process condition calculated by the calculation unit.

Simulation Method

The simulation method according to the embodiment of the present disclosure will be described in detail.

FIG. 1 is a basic flow diagram for the simulation method according to the embodiment of the present disclosure.

The flow shown in FIG. 1 is executed by a simulator (an information processing apparatus, a calculation unit) which will be described later in detail.

First, in Step S1, the simulator reads data on an emission spectrum in the visible wavelength region (300 nm to 800 nm, for example; this region will be referred to as a region A) as input data as shown in FIG. 1. The data on the emission spectrum in the visible wavelength region is data on an emission spectrum in the visible wavelength region, which has been actually emitted in the chamber of the semiconductor manufacturing apparatus (a processing apparatus or the like) and detected with the sensor such as an Optical Emission Spectrometer ("OES".

Next, in Step S2, the simulator quantitatively predicts an emission spectrum in the ultraviolet wavelength region (10 nm to 300 nm, for example; this region will be referred to as a region B) based on plasma emission simulation and recipe information. The plasma emission simulation will be described later in detail. In addition, the recipe information is information indicating emission species and an emission wavelength group in a target process (processing and film forming).

Then, in Step 3, the simulator reads pattern structure data, namely information on a pattern structure as a target to be irradiated with the ultraviolet rays. As pattern structure information, the simulator reads mask information (GDS file information, for example) and film thickness information.

Next, in Step S4, the simulator predicts a damage amount. In this occasion, the simulator cross-checks the emission spectrum in the ultraviolet wavelength region which has been predicted in Step S2 and the read pattern structure data with a damage amount database to thereby predict a damage amount.

Furthermore, each step in the flow in FIG. 1 will be described in detail.

The quantitative prediction of the emission spectrum in the ultraviolet wavelength region in Step S2 in FIG. 1 can be performed as will be described below, for example.

Figure 2:
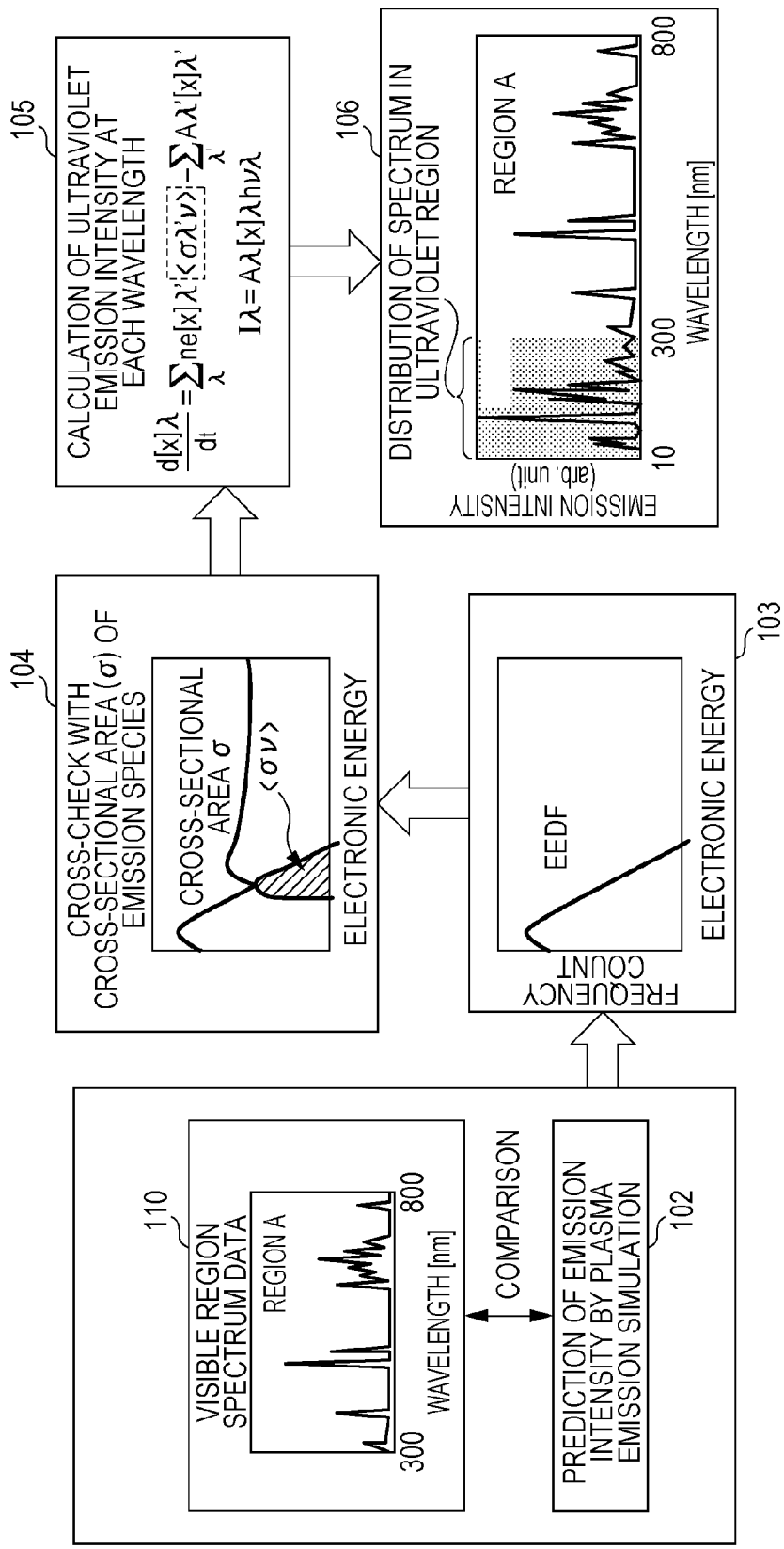
FIG. 2 is a flow diagram of a simulation for quantitatively predicting an emission spectrum in an ultraviolet wavelength region.

FIG. 2 is a flow diagram of the simulation for the quantitative prediction of the emission spectrum in the ultraviolet wavelength region.

The flow shown in FIG. 2 is also executed by the simulator (the information processing apparatus, the calculation unit) which will be described later in detail.

First, in the leftmost process in FIG. 2, data 110 on a spectrum in the visible wavelength region and emission intensity prediction 102 by the plasma emission simulation, which have been detected with the sensor such as an OES during the process using plasma or during the film formation, are compared with each other at a representative wavelength $\lambda$ obtained from the recipe information.

In so doing, EEDF (Electron Energy Distribution Function) 103 is derived as will be described later in detail.

The emission intensity prediction by the plasma emission simulation can be performed by a simulation method disclosed in literatures (see Japanese Unexamined Patent Application Publication No. 2011-134927 and Jpn. J. Appl. Phys., 49, (2010), 08JD01).

Next, a cross-sectional area ($\sigma\lambda$) of a reaction between particles, which emit light at the aforementioned representative wavelength $\lambda$, relating to the emission species is cross-checked with the cross-sectional area database, and $<\sigma\lambda' v>$ 104 is obtained at each wavelength $\lambda$ as the following equation.

$$<\sigma_\lambda \cdot v> = \sigma_\lambda \cdot v f(E) dE$$

where f(E) represents EEDF, v represents an electron rate, and E represents electron energy.

Next, calculation 105 of the ultraviolet emission intensity at each wavelength $\lambda$ is performed using the obtained $<\sigma\lambda' v>$ 104.

That is, $[x]\lambda$ which is population of an excited level relating to emission due to electron shift, fine structure shift, and ultra-fine structure shift accompanying with shift in vibration and rotation is obtained from the following detailed balance equation in consideration of related shift $\lambda'$.

$$\frac{d[x]_\lambda}{dt} = \sum_{\lambda'} n_e [x]_{\lambda'} <\sigma_{\lambda'} v> - \sum_{\lambda'} A_{\lambda'} [x]_{\lambda'}$$

where ne represents electron density, $\sigma\lambda$ represents a reaction cross-sectional area, and A$\lambda$ represents an Einstein coefficient A in the respective shift.

Furthermore, emission intensity I$\lambda$ of light at the wavelength $\lambda$ in the ultraviolet wavelength region is represented as follows by using $[x]\lambda$ obtained by the equation.

$$I_\lambda = A_\lambda [x]_\lambda h v_\lambda \beta \left( \frac{S-P}{S} \right)$$

where h represents a Planck's constant, v$\lambda$ represents a corresponding frequency, $\beta$ represents an escape ratio, S represents a source function, and P represents a background function.

Here, P=0 is obtained when a background component is ignored. In addition, since the optical thickness in the plasma process used in manufacturing a semiconductor is generally thin, $\beta \approx 1$ is approximately satisfied. Thus, the above equation can be represented as follows.

$$I_\lambda = A_\lambda [x]_\lambda h v_\lambda$$

In so doing, the ultraviolet emission intensity at each wavelength $\lambda$ is obtained, and spectrum distribution in the ultraviolet wavelength region (region B) is obtained.

In addition, the obtained spectrum distribution in the ultraviolet wavelength region (region B) and the data 110 on the spectrum in the visible wavelength region (region A) are combined to obtain the emission spectrum distribution 106 in the ultraviolet wavelength region and the visible wavelength region.

Next, an outline of a specific method for predicting emission intensity by plasma emission simulation will be described below.

Figure 3:
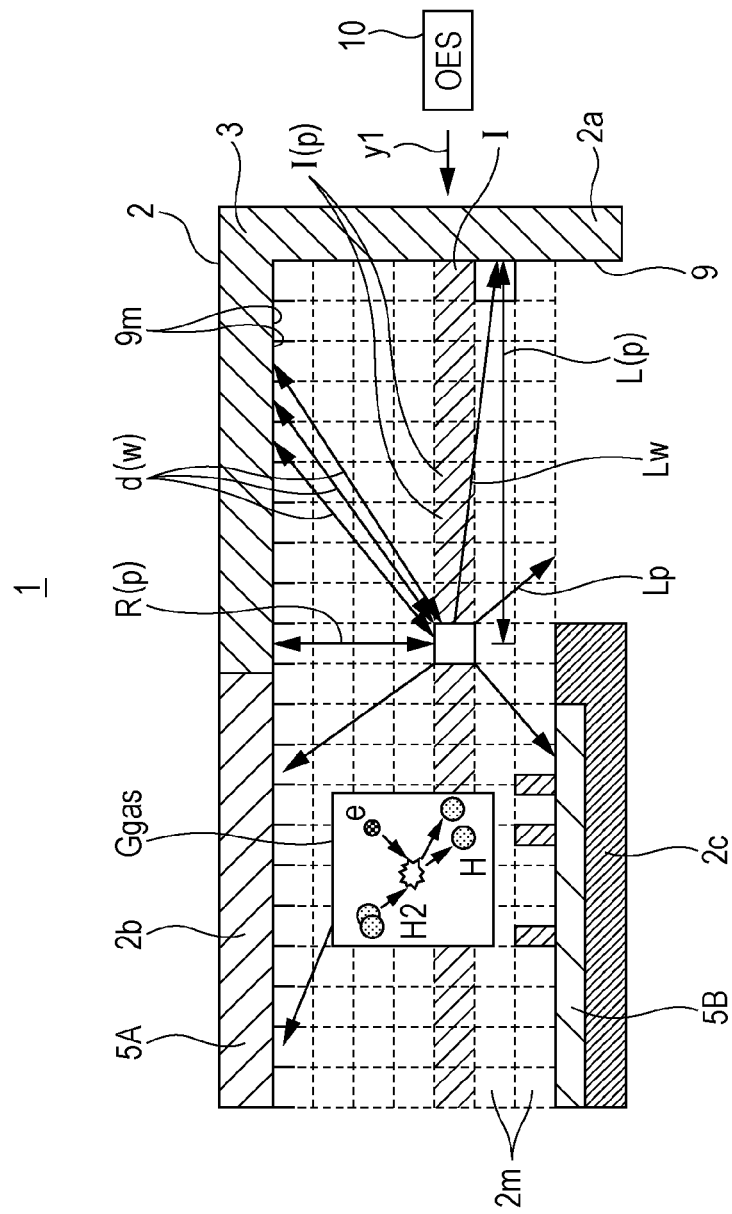
FIG. 3 is a diagram schematically showing a part of a plasma chamber in an apparatus as a target of plasma light emitting simulation.

FIG. 3 is a diagram schematically showing a part of a plasma chamber in an apparatus (an apparatus which performs processing and film formation using plasma) as a target of the plasma emission simulation in order to explain the method and conditions of the plasma emission simulation.

As shown in FIG. 3, an apparatus 1 includes a plasma chamber 2 configured by a chamber base body 3, a space formed in a chamber wall 9 of the plasma chamber 2, a lower electrode 5B provided in the space, and an upper electrode 5A provided at the chamber base body 3.

In the plasma emission simulation, a plurality of mesh spaces 2m are set by sectioning the space in the plasma chamber 2. Then, particle density n is calculated by the simulation for each mesh space 2m.

A plurality of mesh walls 9m are set in the chamber wall 9 by sectioning the chamber wall 9. Then, a particle adhesion rate S is set for each mesh wall 9m.

The adhesion rate S can be appropriately set in accordance with a state of each part of the chamber wall 9 by setting the adhesion rate S for each mesh wall 9m. For example, it is possible to set different adhesion rates S for a part ($SiO_2$) configured by the chamber base body 3 and a part (Si) configured by the upper electrode 5A in the chamber wall 9.

The shapes and the sizes of the mesh spaces 2m and the mesh walls 9m may be appropriately set. The shapes and the sizes (of the end surfaces) of the mesh spaces 2m and the shapes and the sizes of the mesh walls 9m may be the same or different from each other. The sizes of the mesh spaces 2m and the mesh walls 9m are of the order of several mm, for example.

The simulation may be two-dimensional simulation or three-dimensional simulation. In other words, the mesh spaces 2m may be two-dimensionally set or three-dimensionally set, and the mesh walls 9m may be one-dimensionally set or two-dimensionally set.

Hereinafter, p represents an identification number of each mesh space 2m, and (p) is added to a parameter (a function of p), a value of which varies for each mesh space 2m, in some cases.

In addition, w represents an identification number of each mesh wall 9m, and (w) is added to a parameter (a function of w), a value of which varies for each mesh wall 9m, in some cases.

In the simulation, parameters which represent distances between the mesh space 2m and the chamber wall 9 are also taken into consideration. Specifically, a (shortest) distance L(p) between the mesh space 2m and a side wall 2a, a (shortest) distance R(p) between the mesh space 2m and a top plate 2b, and a distance d(w) between the mesh space 2m and the mesh wall 9m are taken into consideration. Although d(w) is also a function of p, addition of p is omitted. The distances L(p), R(p), and d(w) are distances from the center of the mesh space 2m. In addition, d(w) is a distance from the center of the mesh wall 9m, for example.

As described above, the particle density n is appropriately calculated in consideration of the distances from the chamber wall 9. The particle density n is appropriately calculated especially by setting the adhesion rate S(w) and the distance d(w) for each mesh wall 9m.

As a differential equation of the particle density n, the following equation is used, for example.

$$\frac{dn(i,t)}{dt} = \sum_m k_m n(i,t) n(j,t) - \frac{n(i,t)}{\tau_r} - \frac{n(i,t)}{\tau_n}$$

-continued $$\frac{1}{\tau_n} = \sum_w \frac{S(w) v_r}{2d(w)(2-S(w))} + \frac{1}{\tau_D}$$

$$\tau_D = \frac{P\Lambda^2}{D}$$

$$D = \mu \frac{kT_e}{e}$$

$$\frac{1}{\Lambda^2} = \left(\frac{\pi}{L(p)}\right)^2 + \left(\frac{2.405}{R(p)}\right)^2$$

The equation is used for each mesh space 2m as described above. n(i, t) and n(j, t) represent particle density of a particle type i and j, respectively, in a time period t. The particle type i (j) is H, H2, H+, H2+, H3+, or e when gas is hydrogen, for example. Hereinafter, H, H2, and the like are shown in ( ) instead of i and j in some cases.

km represents a reaction rate, τr represents exhaust characteristic time, and τn represents wall losing characteristic time. vr represents a particle rate, D represents a diffusion constant, P represents pressure, μ represents mobility, k represents Boltzmann constant, Te represents electron temperature, and e represents elementary charge.

On the first line of this equation, the first term represents a variation in density due to generation and loss of particles caused by a collision reaction between particles. The second term represents a variation in density of the particle due to exhaust from the plasma chamber 2. The third term represents a variation in density due to an interaction between the particle and the chamber wall 9 and loss of the particle on the wafer.

As shown on first and second lines in the equation, the distance d(w) is incorporated such that more particles are lost as the value of the distance d(w) between the mesh space 2m and the mesh wall 9m becomes smaller.

Next, particle density n (H*) of a particle H* which contributes to light emission is calculated based on the calculated particle density n(i). In addition, H* is based on separate concept from that of the particle types (types i and j in the above equation) such as H and H2, and the particle density n (H*) is not obtained by the above equation.

Specifically, the particle density n (H*) is calculated by solving a differential equation of particle density n (H*), which includes as a parameter the particle density n(i) obtained by the equation for each mesh space 2m, by simulation.

Next, emission intensity I(p) for each mesh space 2m is calculated based on the particle density n (H*) for each mesh space 2m.

Then, the emission intensity I(p) for each mesh space 2m is integrated in a predetermined sight direction y1 to calculate the emission intensity I when the plasma chamber 2 is viewed in the sight direction y1 as shown by hatching in FIG. 3.

As described above, the emission intensity I in the sight direction y1, which is detected by the OES 10, can be reproduced by calculating the emission intensity I in the sight direction y1.

In addition, the sight direction y1 may be appropriately set to a horizontal direction, a vertical direction, directions obliquely intersecting the horizontal and vertical directions, an alignment direction of the mesh spaces 2m, a direction obliquely intersecting the alignment direction, or the like. Moreover, a cross-sectional area of the integrated space in the sight direction y1 may be appropriately set. The position of the integrated space in a direction perpendicularly intersecting the sight direction y1 may be appropriately set, and the emission intensity I in the sight direction y1 may be calculated at a plurality of positions.

By the plasma emission simulation based on the aforementioned method, simulation emission intensity Iλ at each wavelength is obtained. That is, the emission intensity prediction 102 by the plasma emission simulation shown in FIG. 2 is obtained.

Figure 4:
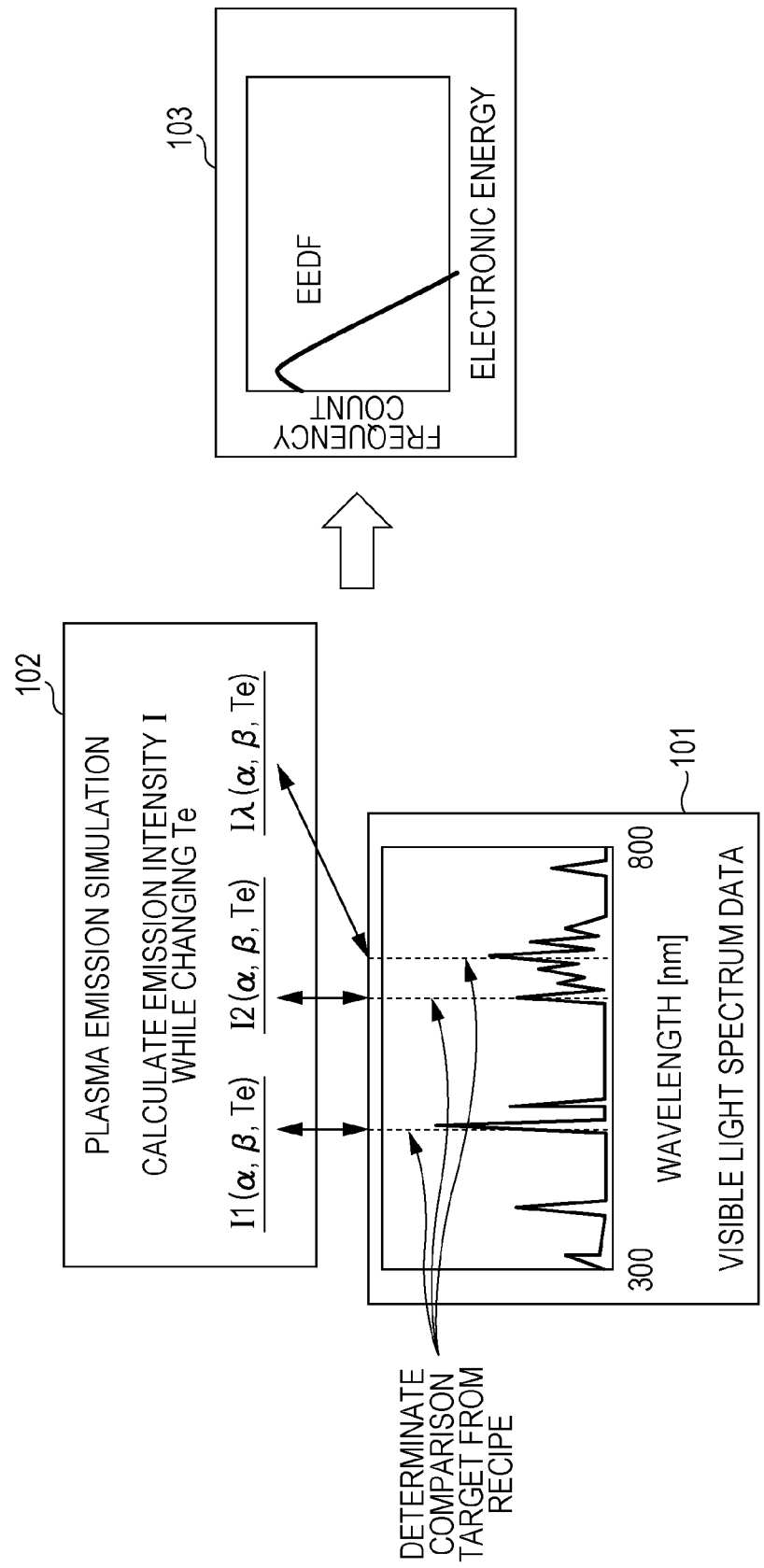
FIG. 4 is a diagram schematically showing a process for obtaining an EEDF from prediction of emission intensity in a plasma light emitting simulation in FIG. 2.

FIG. 4 is a diagram schematically illustrating a process for obtaining the EEDF 103 from the emission intensity prediction 102 by the plasma emission simulation in FIG. 2.

The simulation emission intensity Iλ at each wavelength in the emission intensity prediction 102 is represented as a function of an apparatus structure parameter α, a process condition parameter β, and electron temperature Te as shown in FIG. 4.

Here, the emission intensity Iλ obtained by changing the electron temperature Te in a range of 0 to 10 eV and an actually measured emission intensity value IOλ are compared at the representative wavelength λ (emission species as a target of comparison is determined from the recipe information), for example. Then, the electron temperature Te at which the emission intensity is in a desired error range (±10%, for example) is searched. The EEDF (Electron Energy Distribution Function) 103 is derived on the assumption of Maxwell distribution or the like at the electron temperature Te.

Since the EEDF 103 shown in FIG. 2 is derived as described above, the spectrum distribution in the ultraviolet wavelength region can be obtained by using the EEDF 103 after the process shown in FIG. 2.

In the prediction of a damage amount in Step S4 in FIG. 1, a damage amount database is used. The damage amount database includes combinations of damage amount (crystalline defect) data and each data item on a pattern structure, a dose amount, and process conditions (a gas type, a flow rate, pressure, power) at each specific wavelength for each film type (Si, $SiO_2$, SiN, an organic film, a compound).

Figure 5:
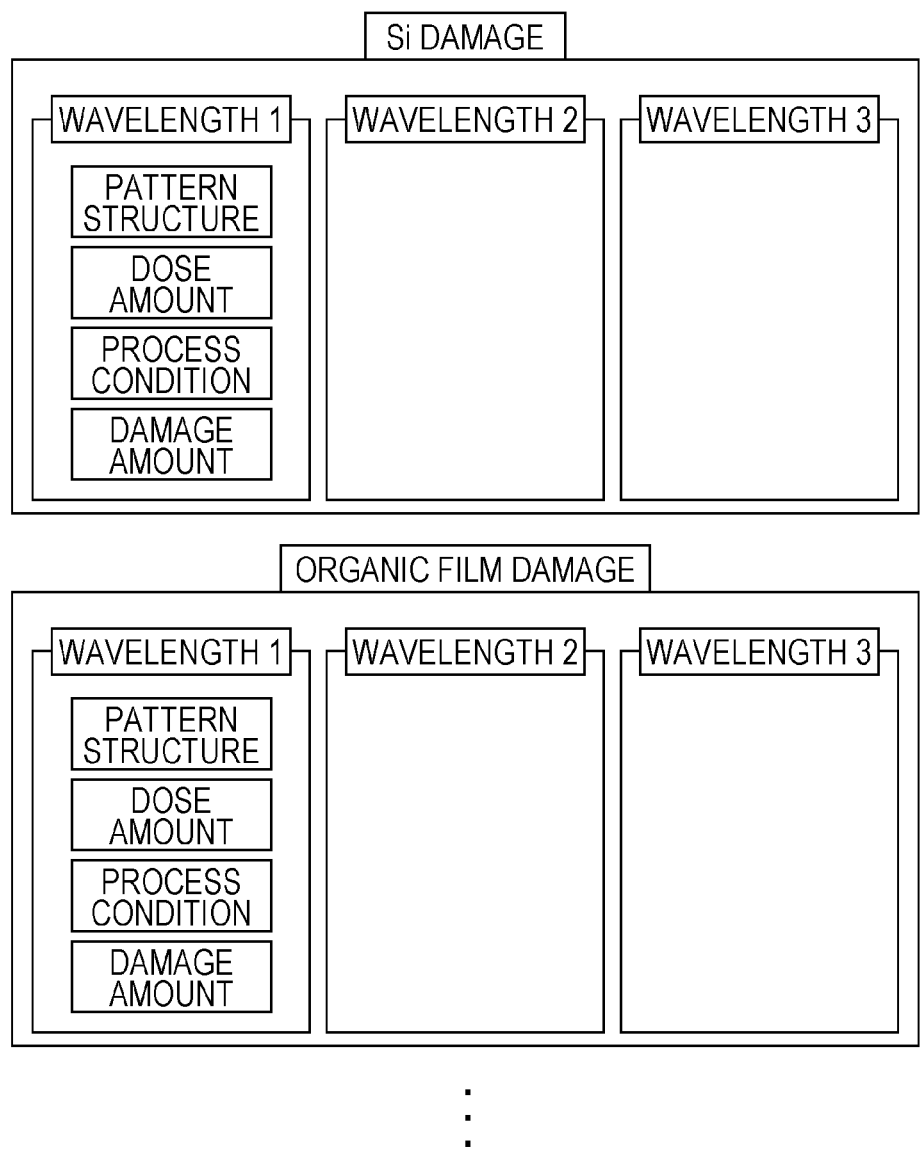
FIG. 5 shows an outline of a part of a damage amount database.

FIG. 5 shows an outline of a part of the damage amount database. FIG. 5 shows combinations of damage amount data and data on the pattern structures, dose amounts, and process conditions at each of specific wavelengths 1, 2, and 3 for Si and the organic film.

Although FIG. 5 shows a pair of combination between the damage amount data and the data on the pattern structure, the dose amount, and the process conditions for the wavelength 1, there are multiple combinations for each of the wavelengths 1, 2, and 3 in an actual damage amount database.

The damage amount database may be created by actually performing measurement in advance or may be created by numerical value simulation or the like using MD (Molecular Dynamics) or the like.

With the use of the damage amount database configured as shown in FIG. 5, it is possible to associate a wavelength and intensity of the ultraviolet rays with process conditions, a pattern structure, and an aperture ratio and to thereby predict a damage amount.

In so doing, it is possible to quantitatively optimize the process conditions and the device structure (or a pattern layout), which minimize damage due to the ultraviolet rays, based on the predicted damage amount.

Then, the simulator cross-checks the calculated emission spectrum in the ultraviolet wavelength region and the information on an actual pattern structure of ultraviolet irradiation, which has been read in Step S3 in FIG. 1, with the damage amount database as shown in FIG. 5 and performs spline interpolation. As described above, a damage amount due to the ultraviolet rays is predicted.

A damage amount due to the ultraviolet rays is predicted as described above, and the processing shown in FIG. 1 is then completed.

According to the aforementioned simulation method of the embodiment of the present disclosure, simulation based on a differential equation for particle density is performed to calculate the particle density, and emission intensity at each wavelength in the visible wavelength region is calculated based on the calculated particle density. Then, the calculated emission intensity at each wavelength in the visible wavelength region and an emission spectrum in the visible wavelength region, which has been actually detected with the sensor, are compared with each other with reference to the information (recipe information) on emission species and an emission wavelength in the target manufacturing process to thereby obtain an electron energy distribution function. Furthermore, emission intensity at each wavelength in the ultraviolet wavelength region is calculated by using the electron energy distribution function and the reaction cross-sectional area relating to the emission species to thereby predict an emission spectrum in the ultraviolet wavelength region. In so doing, the emission spectrum in the ultraviolet wavelength region can be precisely predicted.

Moreover, since a damage amount due to the ultraviolet rays is predicted based on the predicted emission spectrum in the ultraviolet wavelength region, it is possible to precisely predict the emission intensity and the damage amount due to the ultraviolet rays in accordance with a wavelength of the ultraviolet rays emitted during the process.

Semiconductor Manufacturing Apparatus

Figure 6:
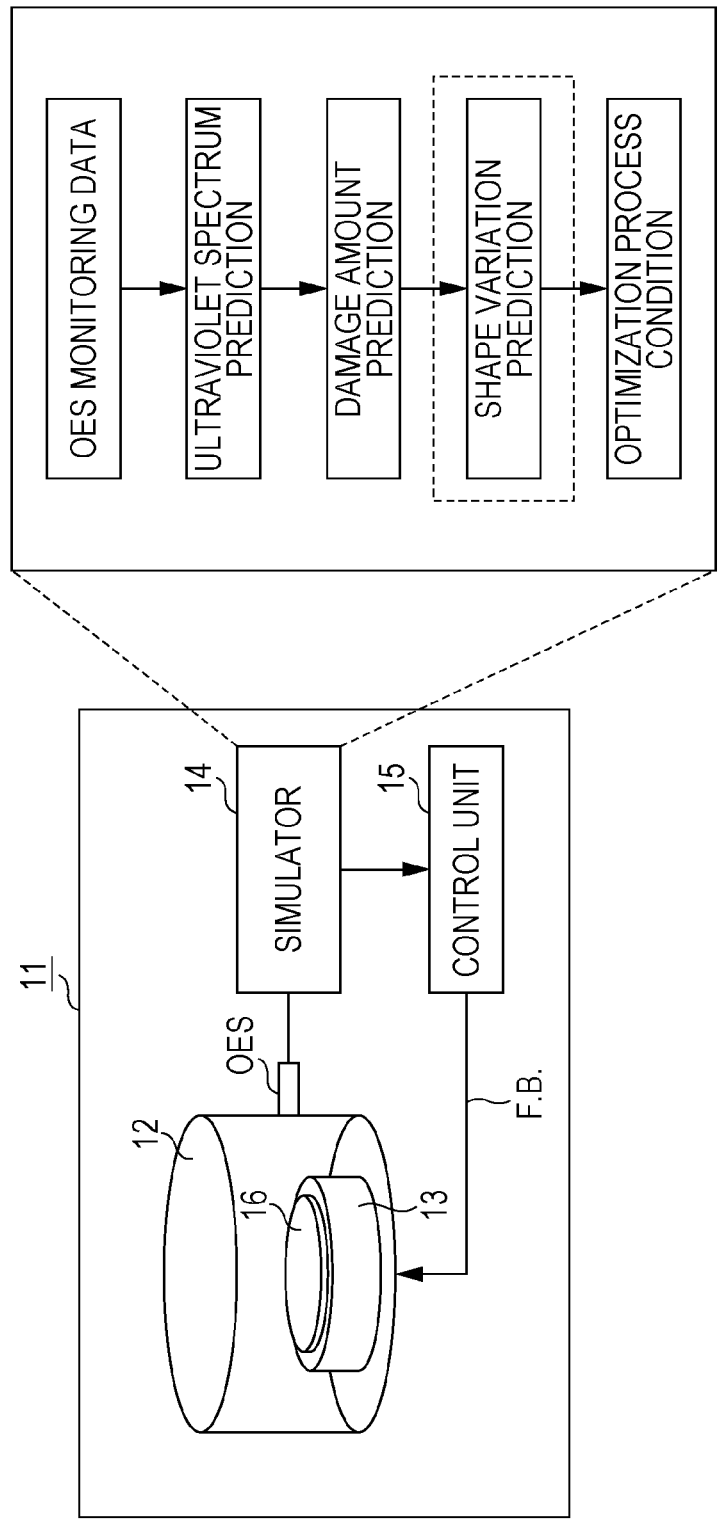
FIG. 6 is a conceptual diagram of a semiconductor manufacturing apparatus according to an embodiment of the present disclosure.
Figure 7:
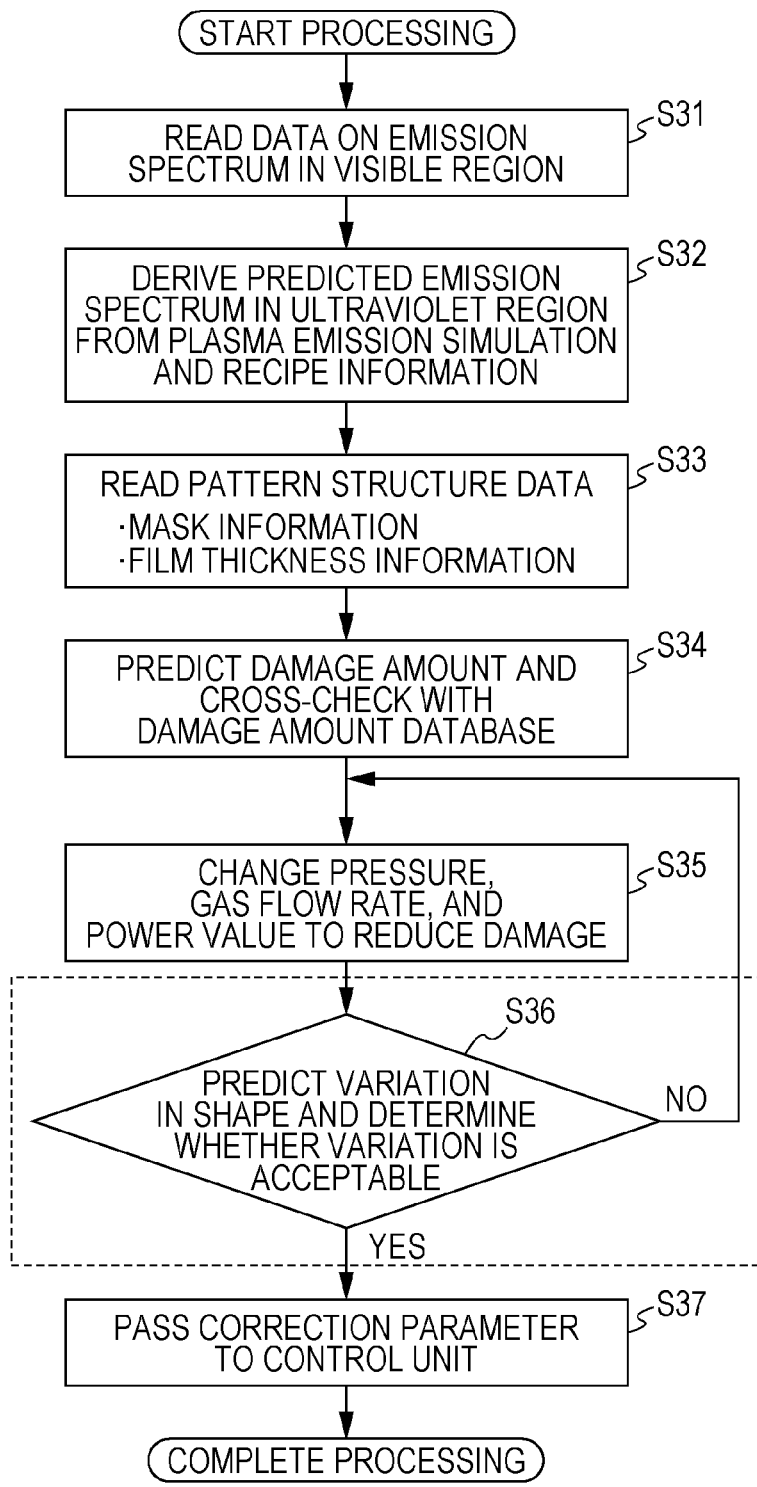
FIG. 7 is a flowchart for correcting conditions for a manufacturing process by the semiconductor manufacturing apparatus in FIG. 6.

FIG. 6 is a conceptual diagram of a semiconductor manufacturing apparatus according to an embodiment of the present disclosure. In addition, FIG. 7 is a flowchart for a process correcting operation by the semiconductor manufacturing apparatus according to the embodiment of the present disclosure.

A semiconductor manufacturing apparatus 11 shown in FIG. 6 includes a plasma chamber 12, an OES as a monitor for emission in the visible wavelength region, a simulator 14 with a simulation program (software) for executing simulation mounted thereon, and a control unit 15. The simulator 14 is an information processing apparatus such as a computer and corresponds to the "calculation unit" according to the embodiment of the present disclosure.

An electrode 13 is provided at a lower part in the plasma chamber 12. A wafer 16 is subjected to film formation and film processing while being placed on the electrode 13.

Although not shown in the drawing, an electrode (upper electrode) is provided even at an upper part in the plasma chamber 12, and the film formation and the film processing are performed on the wafer 16 in a state in which plasma is generated by generating an electric field between the electrode (lower electrode) 13 and the upper electrode.

The simulation program (software) to be mounted on the simulator 14 is configured to be operable on-line and/or off-line.

In addition, the simulator 14 performs an operation for predicting a spectrum in the ultraviolet wavelength region from monitoring data obtained by the OES, predicting a damage amount, and searching optimized process conditions as shown in the right drawing in FIG. 6.

In addition, the simulation program (software) to be mounted on the simulator 14 may be configured to search the optimized process conditions by further performing shape variation prediction surrounded by a broken line after the prediction of a damage amount.

The control unit 15 performs control so as to provide feedback of the corrected process conditions for the plasma chamber 12, which have been obtained in the simulation executed by the simulator 14, to the plasma chamber 12.

In addition, it is also possible to employ a configuration other than the OES shown in FIG. 6 as the monitor for emission in the visible wavelength region.

Moreover, the semiconductor manufacturing apparatus 11 shown in FIG. 6 corrects conditions for the manufacturing process based on the flowchart shown in FIG. 7, for example.

First, in Step S31, the OES provided in the plasma chamber 12 subsequently obtains data on an emission spectrum in the visible wavelength region (wavelength from 300 to 800 nm, for example) during the plasma process as shown in FIG. 7.

Then, in Step S32, the simulator 14 predicts an emission spectrum in the ultraviolet wavelength region based on the aforementioned plasma emission simulation and the recipe information.

Next, in Step S33, the simulator 14 reads data on a pattern structure as a target of ultraviolet irradiation (mask information, film thickness information, and the like).

Then, in Step S34, the simulator 14 predicts a damage amount due to the ultraviolet rays by the aforementioned simulation method. Here, the simulator 14 cross-checks the emission spectrum in the ultraviolet wavelength region, which has been predicted in Step S32, and the read pattern structure data with the damage amount database to thereby predict a damage amount.

Next, in Step S35, the simulator 14 selects process conditions (pressure, a flow rate, power), which reduce damage within a range near recipe conditions (±50%, for example), from the damage amount database.

When the shape variation prediction surrounded by broken lines in FIGS. 6 and 7 is not performed, the processing directly proceeds to Step S37, and the simulator 14 passes a correction parameter under the selected process conditions to the control unit 15.

On the other hand, when the shape variation prediction surrounded by the broken lines in FIGS. 6 and 7 is performed, the processing proceeds from Step S35 to Step S36, and the simulator 14 performs the shape variation prediction. Specifically, the simulator 14 predicts a variation in the shape by performing shape simulation by using the selected process conditions, a wafer aperture ratio, a semi-local aperture ratio, and a pattern structure. For the shape simulation, a method disclosed in Japanese Unexamined Patent Application Publication No. 2009-152269, for example, can be employed.

When the variation is within an acceptable range (within ±10%, for example) as a result of the prediction, the processing proceeds to Step S37, and the simulator 14 passes the correction parameter under the selected process conditions to the control unit 15.

On the other hand, when the variation exceeds the acceptable range, the processing returns to Step S35, and the simulator 14 selects process conditions, under which damage can be reduced, which are different from the previously selected process conditions. Then, the processing proceeds to Step S36, and the simulator 14 performs the shape variation prediction under the selected process conditions.

The simulator 14 repeats the above steps to search a shape which meets a specification and optimized process conditions under which a damage amount due to the ultraviolet rays can be reduced.

When the process conditions are determined, the simulator 14 passes the determined process conditions to the side of the plasma chamber 12 through the control unit 15 and corrects the process conditions in real time.

Since the semiconductor manufacturing apparatus according to the embodiment of the present disclosure predicts an ultraviolet spectrum by using the information on emission in the visible wavelength region, which reflects a plasma state and a chamber wall state during the processing, as described above, it is possible to more precisely control a damage amount due to the ultraviolet rays as compared with methods in the related art. Thus, it is possible to enhance an electric characteristic of a semiconductor device, namely a transistor I-V characteristic, white spot and dark current of an imager, conversion efficiency of a solar cell, a laser output characteristic, and the like.

In addition, it is possible to further optimize the process conditions when the shape variation prediction is also performed.

The semiconductor manufacturing apparatus according to the embodiment of the present disclosure can employ processing such as dry etching, CVD (Chemical Vapor Deposition), and PVD (Physical Vapor Deposition) regardless of the type of processing as long as plasma is used.

2. First Embodiment (Simulation Method)

Next, specific embodiments will be described.

First, description will be given of a simulation method according to a first embodiment.

In the simulation method according to the embodiment, monitoring data by the OES is used to perform simulation of an ultraviolet emission spectrum and a damage amount.

Figure 8:
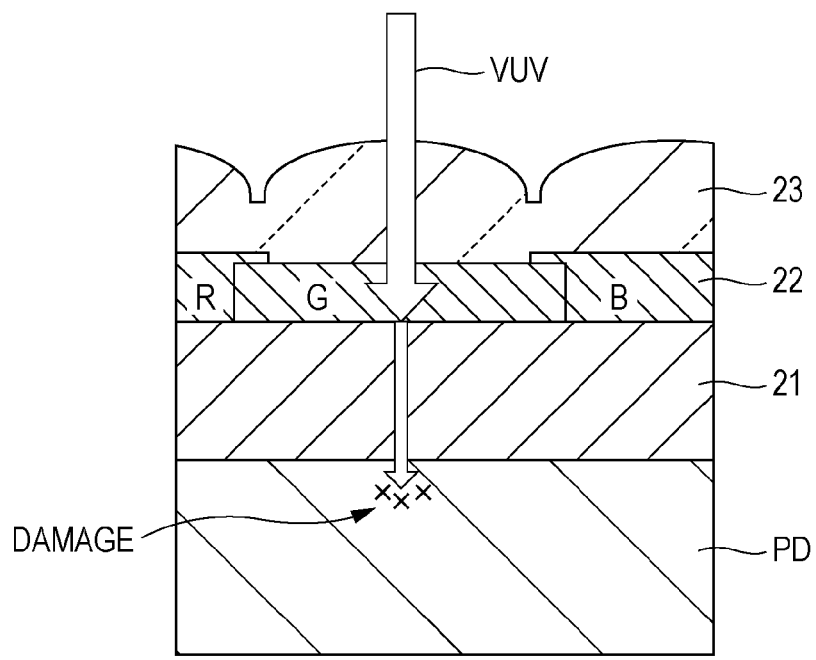
FIG. 8 is a pattern structure diagram used in simulation methods according to first and sixth embodiments.

FIG. 8 is a pattern structure diagram used in the simulation method according to the embodiment.

The pattern structure shown in FIG. 8 includes layers from a photodiode PD of a back irradiation type image sensor (pixel size of 1.5 μm) to an OCL (On Chip Lens).

The thickness of the photodiode PD is 3000 nm, the thickness of an inter-layer film 21 provided thereon is 1500 nm, the thickness of a color filter 22 for three colors R, G, and B provided thereon is 700 nm, and the thickness of the OCL 23 provided thereon is 700 nm.

FIG. 8 is a conceptual diagram showing a state in which vacuum ultraviolet VUV generated during dry etching performed on the OCL 23 is attenuated and transmitted through the OCL 23, the color filter 22, and the inter-layer film 21 and damages the photodiode PD in manufacturing such a pattern structure. Here, the vacuum ultraviolet VUV is at a wavelength from 10 to 200 nm.

According to the embodiment, the amount of damage given by the vacuum ultraviolet VUV to the photodiode PD in this state is predicted by simulation.

Structure information of a processing apparatus and process conditions used in processing the OCL 23 will be shown below.

Processing Apparatus
CCP (Capacitive Coupled Plasma) dry etching apparatus
Frequency: upper part=60 MHz, lower part=2 MHz
Chamber Diameter: 100 cm
Gap between Upper and Lower Electrodes: 40 mm
Visible Light Monitoring Apparatus: OES
Process Conditions
Gas Type: CF4
Gas Flow Rate: 150 sccm
Pressure: 60 mTorr
Upper Application Power: 1000 W
Etching Time: 15 minutes The OES (wavelength band: 200 to 800 nm, wavelength resolution: 0.5 nm) as the visible light monitoring apparatus is installed with a port of a chamber wall of the processing apparatus (a material for a window is sapphire, for example) in between.

The OES subsequently obtains data on an emission spectrum emitted from plasma during the etching.

According to the embodiment, information on the aforementioned processing apparatus, structure information (the layer thickness of each of the OCL 23, the color filter 22, and the inter-layer film 21), information on the aforementioned process conditions, and visible emission spectrum information obtained by the OES are used as input information.

As spectrum wavelengths to be used for deriving the electron energy distribution, 321 nm (caused by CF2 radicals), 240 nm (caused by CF radicals), and 686 nm (caused by F radicals), for example, can be used. However, the wavelengths are not limited thereto for higher intensity.

Then, such input information and the method for predicting a damage amount according to the embodiment of the present disclosure shown in FIG. 1 are used.

In so doing, it is possible to predict a spectrum in the ultraviolet wavelength region at a wavelength of not longer than 200 nm and an amount of crystalline defects in silicone formed in a surface layer of the photodiode PD by simulation according to the embodiment.

According to the aforementioned simulation method of the embodiment, simulation based on a differential equation for particle density is performed to calculate the particle density, and emission intensity at each wavelength in the visible wavelength region is calculated based on the calculated particle density. Then, referring to the recipe information (information on emission species and an emission wavelength in the target manufacturing process), the calculated emission intensity at each wavelength in the visible wavelength region and an emission spectrum in the visible wavelength region, which has been actually obtained by the OES are used as input information. An emission spectrum in the ultraviolet wavelength region is predicted from such input information by using the method for predicting a damage amount according to the embodiment of the present disclosure, and a damage amount due to the ultraviolet rays is predicted from the predicted emission spectrum in the ultraviolet wavelength region. In so doing, it is possible to precisely predict emission intensity and a damage amount due to the ultraviolet rays in accordance with the wavelength of the ultraviolet rays emitted during the process.

Although the technique of the present disclosure was applied to the CCP dry etching apparatus in the embodiment, the simulation method according to the embodiment of the present disclosure may be applied to any processing apparatus such as an ICP (Inductive Coupled Plasma) apparatus or an ECR (Electron Cyclotron Resonance) apparatus regardless of the type.

In addition, the processing process to which the simulation method according to the embodiment of the present disclosure is applied may be performed on a transistor, STI (Shallow Trench Isolation), a side wall, a contact hole, or the like regardless of the type as well as the dry etching performed on the OCL 23 with the pattern structure shown in FIG. 8.

Furthermore, the process conditions to which the simulation method according to the embodiment of the present disclosure is applied is also not particularly limited as long as a target film can be processed.

3. Second Embodiment (Simulator)

Next, description will be given of a simulator according to a second embodiment.

A simulator (an information processing apparatus, a calculation unit) according to the embodiment mounts thereon a computer program (software), which is caused to execute a simulation function for predicting a damage amount according to the embodiment of the present disclosure, and executes the simulation method of the embodiment of the present disclosure.

Figure 9:
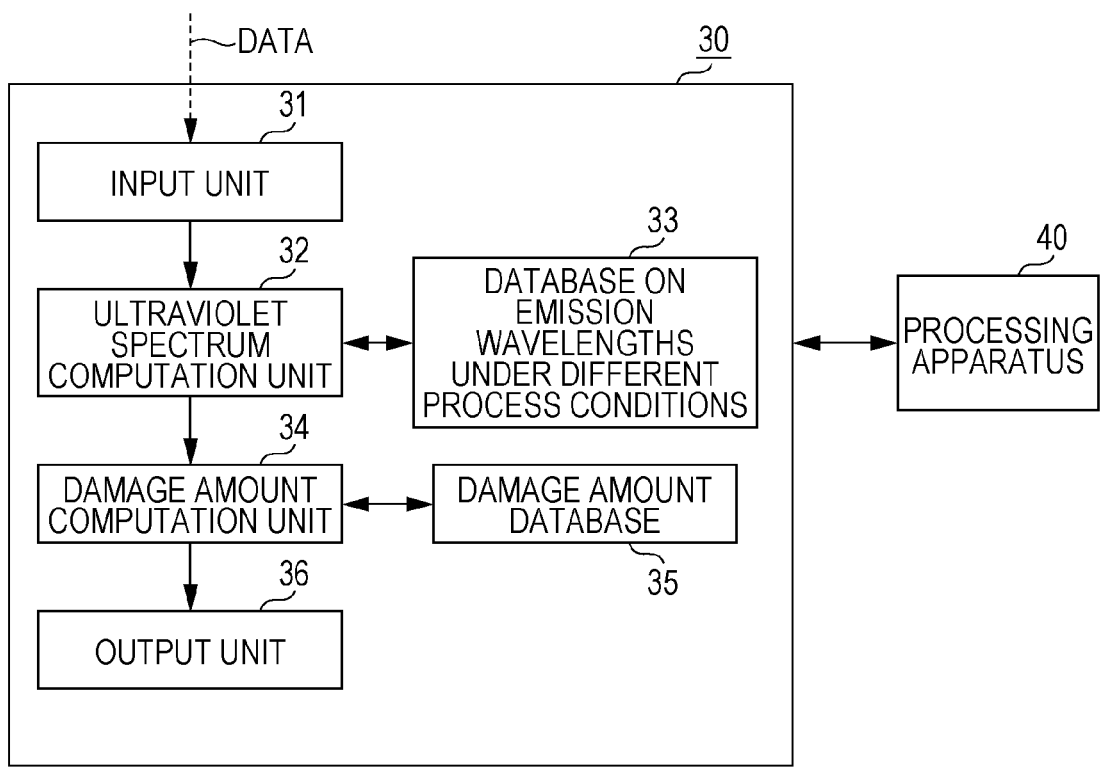
FIG. 9 is a conceptual diagram of a simulator according to second and seventh embodiments.

FIG. 9 is a conceptual diagram of the simulator according to the second embodiment.

A simulator 30 shown in FIG. 9 includes an input unit 31, an ultraviolet spectrum computation unit 32, a database 33 on wavelengths of emission under different process conditions, a damage amount computation unit 34, a damage amount database 35, and an output unit 36.

The simulator 30 exchanges signals and data with a processing apparatus 40 such as an etching apparatus.

In addition, processing proceeds in an order shown by arrows in FIG. 9 in the simulator 30.

Various kinds of data DATA is input to the input unit 31 as input information.

Examples of the various kinds of data DATA include pattern structure data (GDS data, for example), film thickness data, an apparatus parameter, a process parameter, a visible emission spectrum data, and the like.

The ultraviolet spectrum computation unit 32 uses the data DATA input to the input unit 31, obtains corresponding wavelength data with reference to the database 33 on wavelengths of emission under different process conditions based on the data DATA, and performs computation for obtaining an emission spectrum in the ultraviolet wavelength region. The database 33 on the wavelengths of emission under different process conditions contains a group of wavelengths for each process condition as data.

The damage amount computation unit 34 uses the emission spectrum in the ultraviolet wavelength region, which has been obtained by the ultraviolet spectrum computation unit 32, and performs computation for obtaining a damage amount with reference to the damage amount database 35 based on the emission spectrum in the ultraviolet wavelength region and the input data DATA.

The output unit 36 outputs the obtained damage amount from the simulator 30 to the outside.

The computer program (software) to be mounted on the simulator according to the embodiment is preferably configured to execute data input and calculation and to display a process of the calculation and a result thereof in response to operations performed on a GUI (graphical user interface). Although a GUI constructed by tcl/tk, Motif, or the like can be employed as the GUI, the embodiment of the present disclosure is not limited thereto.

In addition, an operation platform for the computer program (software) to be mounted on the simulator according to the embodiment can be applied to various OSs (Operation Systems) regardless of the type thereof.

Furthermore, the computer program (software) to be mounted on the simulator according to the embodiment may be operated off-line or may be connected with the simulator 30 on-line.

4. Third Embodiment (Dry Etching Apparatus)

Next, description will be given of a dry etching apparatus according to a third embodiment.

The dry etching apparatus according to the embodiment is configured to automatically control the process conditions so as to optimize a damage amount due to the ultraviolet rays.

Figure 10:
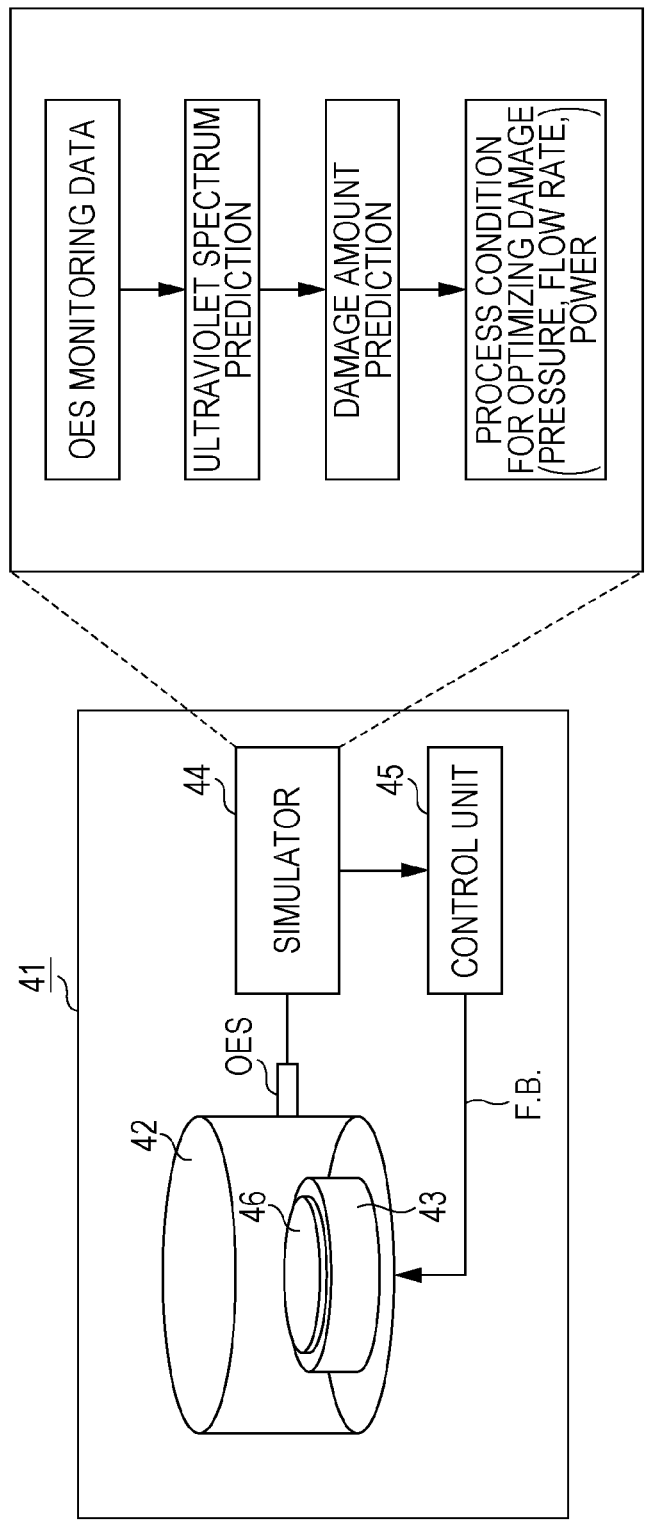
FIG. 10 is an outlined configuration diagram of a dry etching apparatus according to third and eighth embodiments.

FIG. 10 is an outlined configuration diagram (block diagram) of the dry etching apparatus according to the third embodiment.

The dry etching apparatus 41 shown in FIG. 10 includes a plasma chamber 42, an OES, a simulator 44 with a simulation program (software) for executing simulation mounted thereon, and a control unit 45. The simulator 44 is an information processing apparatus such as a computer and corresponds to the "calculation unit" according to the embodiment of the present disclosure.

An electrode 43 is provided at a lower part in the plasma chamber 42. A wafer 46 is subjected to an etching process while being placed on the electrode 43.

Although not shown in the drawing, an electrode (upper electrode) is provided even at an upper part in the plasma chamber 42, and the etching processing is performed on the wafer 46 in a state in which plasma is generated by generating an electric field between the electrode (lower electrode) 43 and the upper electrode.

The OES is installed with a port window of the wall of the plasma chamber 42 in between.

The OES can be configured to have waveform resolution of 0.5 nm and a wavelength band from 300 nm to 800 nm, for example.

Conditions for etching by the dry etching apparatus 41 according to the embodiment may be set such that a frequency of the upper electrode is 60 MHz, a frequency of the lower electrode is 13.56 MHz, a diameter of the plasma chamber 42 is 100 cm, and a gap between the upper and lower electrodes is 40 mm, for example.

The simulation program (software) to be mounted on the simulator 44 is configured to be operable on-line and/or off-line.

In addition, the simulator 44 executes an operation for predicting a spectrum in the ultraviolet wavelength region from the monitoring data obtained by the OES, predicting a damage amount, and searching optimized process conditions as shown in the right drawing in FIG. 10.

The control unit 45 performs control so as to provide feedback of the corrected process conditions for the plasma chamber 42, which have been obtained by the simulation, to the plasma chamber 42.

In addition, it is also possible to employ a configuration other than the OES shown in FIG. 10 as a monitor for emission in the visible wavelength region.

Figure 11:
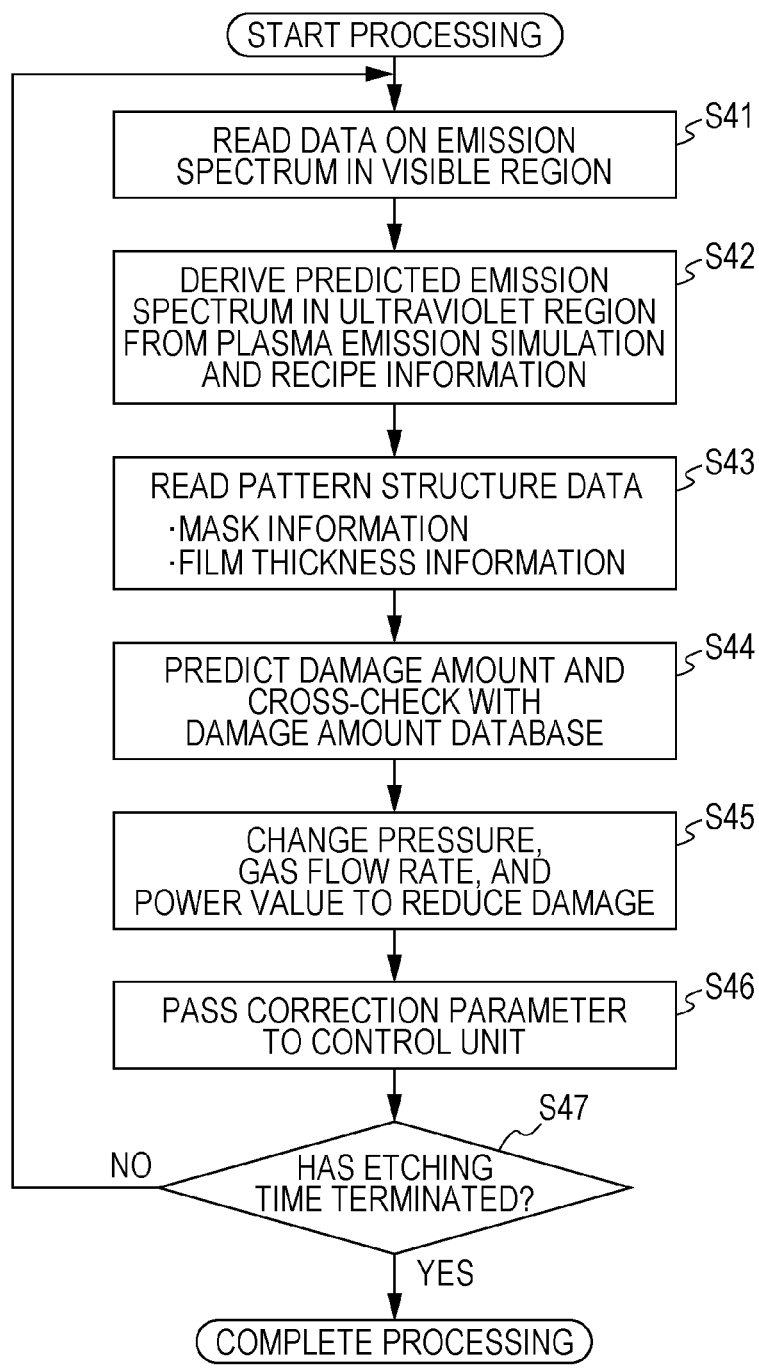
FIG. 11 is a flowchart for correcting conditions for a manufacturing process by the dry etching apparatus in FIG. 10.

The dry etching apparatus 41 shown in FIG. 10 corrects conditions for the manufacturing process based on the flowchart shown in FIG. 11, for example.

First, in Step S41, the OES provided in the plasma chamber 42 obtains data on an emission spectrum in the visible wavelength region (wavelength from 300 to 800 nm, for example) for every one second, for example, as shown in FIG. 11.

Then, in Step S42, the simulator 44 predicts an emission spectrum in the ultraviolet wavelength region based on the aforementioned plasma emission simulation and the recipe information.

Next, in Step S43, the simulator 44 reads data on a pattern structure (mask information, film thickness information, and the like) as a target of ultraviolet irradiation.

Then, in Step S44, the simulator 44 predicts a damage amount due to the ultraviolet rays by the aforementioned simulation method. Here, the simulator 44 cross-checks the predicted emission spectrum in the ultraviolet wavelength region and the read pattern structure data with the damage amount database to predict the damage amount.

Next, in Step S45, the simulator 44 selects process conditions (pressure, a flow rate, power), under which damage is reduced within a range near recipe conditions (±50%, for example), from the damage amount database.

Then, in Step S46, the simulator 44 passes a correction parameter under the selected process conditions to the control unit 45.

By subsequently repeating the above steps until the completion of the etching, it is possible to perform dry etching while reducing a damage amount due to the ultraviolet rays.

Then, in Step S47, the simulator 44 determines whether or not etching time has passed.

When the etching time has passed, the etching processing is completed.

When the etching time has not passed, the processing returns to Step S41, and the OES obtains data on an emission spectrum in the visible wavelength region.

As described above, the dry etching can be performed while a damage amount due to the ultraviolet rays is reduced.

In the embodiment, any of a CCP apparatus, an ICP apparatus, and an ECR apparatus can be used as the dry etching apparatus.

In addition, the embodiment can be also applied to a semiconductor processing apparatus using plasma, such as a CVD (Chemical Vapor Deposition) apparatus or a PVD (Physical Vapor Deposition) apparatus.

According to the dry etching apparatus 41 according to the aforementioned embodiment, the simulator 44 predicts an emission spectrum in the ultraviolet wavelength region and a damage amount and selects process conditions for optimizing the damage amount. Then, the control unit 45 performs control so as to provide feedback of the corrected process conditions for the plasma chamber 42, which have been obtained by the simulation, to the plasma chamber 42.

In so doing, the process conditions for the process chamber 42 are controlled so as to optimize (minimize) the damage amount, and therefore, it is possible to reduce the damage amount due to the ultraviolet rays during the dry etching.

Accordingly, it is possible to manufacture a semiconductor device, which exhibits a satisfactory characteristic, with less damage due to the ultraviolet rays during the dry etching.

5. Fourth Embodiment (Dry Etching Apparatus)

Next, description will be given of a dry etching apparatus according to a fourth embodiment.

The dry etching apparatus according to the embodiment is configured to automatically control process conditions so as to optimize a damage amount due to the ultraviolet rays while a variation in shape is also taken into consideration.

Figure 12:
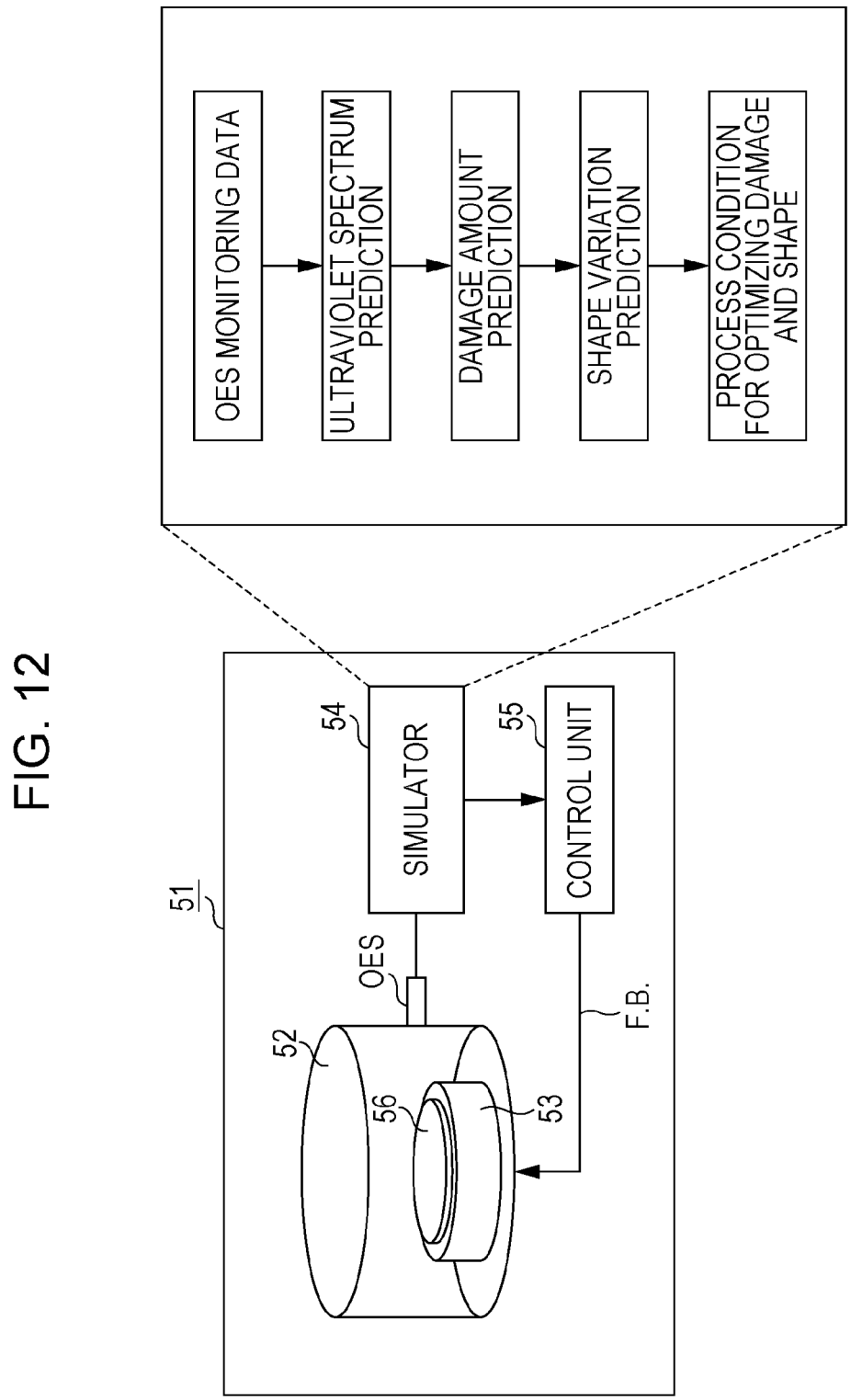
FIG. 12 is an outlined configuration diagram (block diagram) of a dry etching apparatus according to fourth and ninth embodiments.

FIG. 12 is an outlined configuration diagram (block diagram) of the dry etching apparatus according to the fourth embodiment.

A dry etching apparatus 51 shown in FIG. 12 includes a plasma chamber 52, an OES, a simulator 54 with a simulation program (software) for executing simulation mounted thereon, and a control unit 55. The simulator 54 is an information processing apparatus such as a computer and corresponds to the "calculation unit" according to the embodiment of the present disclosure.

An electrode 53 is provided at a lower part in the plasma chamber 52. A wafer 56 is subjected to the etching process while being placed on the electrode 53.

Although not shown in the drawing, an electrode (upper electrode) is provided even at an upper part in the plasma chamber 52, and the etching process is performed on the wafer 56 in a state in which plasma is generated by generating an electric field between the electrode (lower electrode) 53 and the upper electrode.

The OES is installed with a port window of the wall of the plasma chamber 52 in between.

The OES can be configured to have waveform resolution of 0.5 nm and a wavelength band from 300 nm to 800 mm, for example.

In the dry etching apparatus 51 according to the embodiment, conditions for etching is set such that a frequency of the upper electrode is 60 MHz, a frequency of the lower electrode is 13.56 MHz, a diameter of the plasma chamber 52 is 100 cm, and a gap between the upper and lower electrodes is 40 mm, for example.

The simulation program (software) to be mounted on the simulator 54 is configured to be operable on-line and/or off-line.

In addition, the simulator 54 executes an operation for predicting a spectrum in the ultraviolet wavelength region from the monitoring data obtained by the OES and predicting a damage amount as shown in the right drawing in FIG. 12.

The simulator 54 further executes an operation for predicting a variation in the shape and searching optimized process conditions after the prediction of the damage amount.

The control unit 55 performs control so as to provide feedback of the corrected process condition for the plasma chamber 52, which have been obtained by the simulation, to the plasma chamber 52.

In addition, a configuration other than the OES shown in FIG. 12 can be employed as a monitor for emission in the visible wavelength region.

Figure 13:
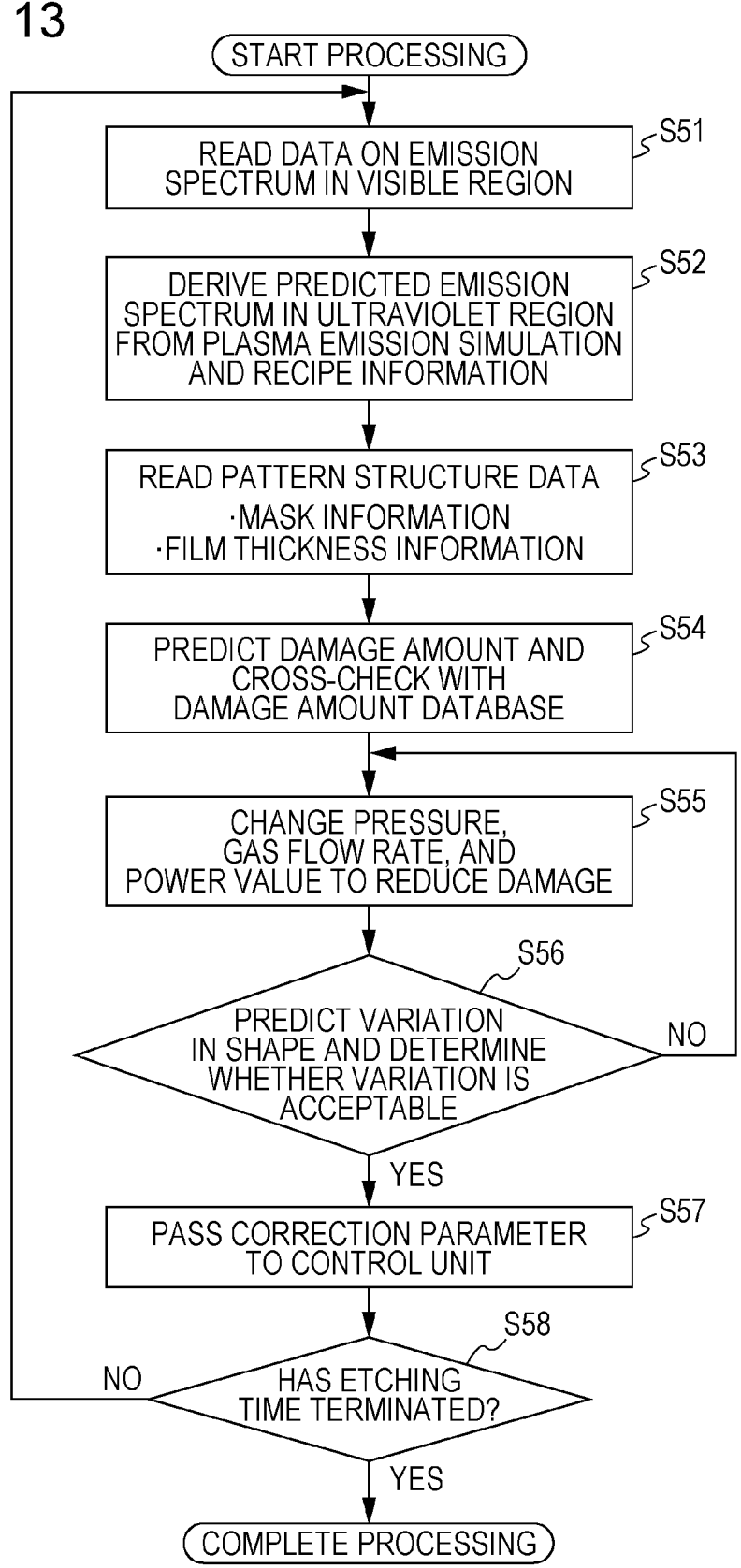
FIG. 13 is a flowchart for correcting conditions for a manufacturing process by the dry etching apparatus in FIG. 12.

Moreover, the dry etching apparatus 51 shown in FIG. 12 corrects conditions for the manufacturing process based on the flowchart shown in FIG. 13, for example.

First, in Step S51, the OES provided in the plasma chamber 52 obtains data on an emission spectrum in the visible wavelength region (wavelength from 300 to 800 nm, for example) for every one second, for example, during the dry etching as shown in FIG. 13.

Next, in Step S52, the simulator 54 predicts an emission spectrum in the ultraviolet wavelength region based on the aforementioned plasma emission simulation and the recipe information.

Then, in Step S53, the simulator 54 reads data on a pattern structure (mask information, film thickness information, and the like) as a target of the ultraviolet irradiation.

Next, in Step S54, the simulator 54 predicts a damage amount due to the ultraviolet rays by the aforementioned simulation method. Here, the simulator 54 cross-checks the predicted emission spectrum in the ultraviolet wavelength region and the read pattern structure data with the damage amount database to predict a damage amount.

Then, in Step S55, the simulator 54 selects process conditions (pressure, a flow rate, power), under which damage is reduced within a range near recipe conditions (±50%, for example), from the damage amount database.

Next, the processing proceeds to Step S56, and the simulator 54 performs shape variation prediction. Specifically, the simulator 54 predicts a variation in the shape by performing shape simulation by using the selected process conditions, a wafer aperture ratio, a semi-local aperture ratio, and a pattern structure. In addition, the semi-local aperture ratio is an aperture ratio of a resist mask in a region of several tens mm around a focused pattern (30 mm, for example; this value differs depending on the process conditions and is a value which is several times as large as a mean free path of the particle).

For the shape simulation, a method disclosed in Japanese Unexamined Patent Application Publication No. 2009-152269, for example, can be employed.

When the variation in the shape is within an acceptable range as a result of the prediction, the processing proceeds to Step S57, and the simulator 54 passes a correction parameter under the selected process conditions to the control unit 55.

On the other hand, when the variation in the shape exceeds the acceptable range, the processing returns to Step S55, and the simulator 54 selects process conditions, under which damage can be reduced, which are different from the previously selected process conditions. Then, the processing proceeds to Step S56, and the simulator 54 performs the shape variation prediction under the selected process conditions.

When the process conditions are determined, the simulator 54 sends the determined process conditions to the side of the plasma chamber 52 through the control unit 55 and corrects the process conditions in real time.

By subsequently repeating the above steps until the completion of the etching, it is possible to control the shape which meets a specification and reduce a damage amount due to the ultraviolet rays.

Next, in Step S58, the simulator 54 determines whether or not the etching time has passed.

When the etching time has passed, the etching processing is completed.

When the etching time has not passed, the processing returns to Step S51, and the OES obtains data on an emission spectrum in the visible wavelength region.

As described above, it is possible to perform dry etching while suppressing a variation in the shape and reducing a damage amount due to the ultraviolet rays.

In the embodiment, any of a CCP apparatus, an ICP apparatus, and an ECR apparatus can be used as the dry etching apparatus.

In addition, the embodiment can be also applied to a semiconductor processing apparatus using plasma, such as a CVD (Chemical Vapor Deposition) apparatus or a PVD (Physical Vapor Deposition) apparatus.

In the dry etching apparatus 51 according to the aforementioned embodiment, the simulator 54 predicts an emission spectrum in the ultraviolet wavelength region and a damage amount and selects process conditions for optimizing the damage amount. In addition, the control unit 55 performs control so as to provide feedback of the corrected process conditions for the plasma chamber 52, which have been obtained by the simulation, to the plasma chamber 52.

In so doing, the process conditions for the process chamber 52 are controlled so as to optimize (minimize) a damage amount, and therefore, it is possible to reduce the damage amount due to the ultraviolet rays during the dry etching.

Accordingly, it is possible to manufacture a semiconductor device, which exhibits a satisfactory characteristic, with less damage due to the ultraviolet rays during the dry etching.

According to the dry etching apparatus 51 of the aforementioned embodiment, the simulator 54 further predicts a variation in the shape between the prediction of the emission spectrum in the ultraviolet wavelength region and the prediction of the damage amount.

For this reason, it is possible to stably manufacture at a high yield a semiconductor device, which exhibits a satisfactory characteristic, with less variation in the shape during the dry etching.

6. Fifth Embodiment (Dry Etching Apparatus and Method for) Etching Process

Next, description will be given of a dry etching apparatus according to a fifth embodiment. In addition, a method for an etching process using the dry etching apparatus will be described.

The dry etching apparatus according to the embodiment is configured to control detection of a termination point of overetching by simulation of a damage amount.

Each part of the dry etching apparatus can be configured in the same manner as in the apparatuses shown in FIGS. 6, 10, and 12.

Figure 14:
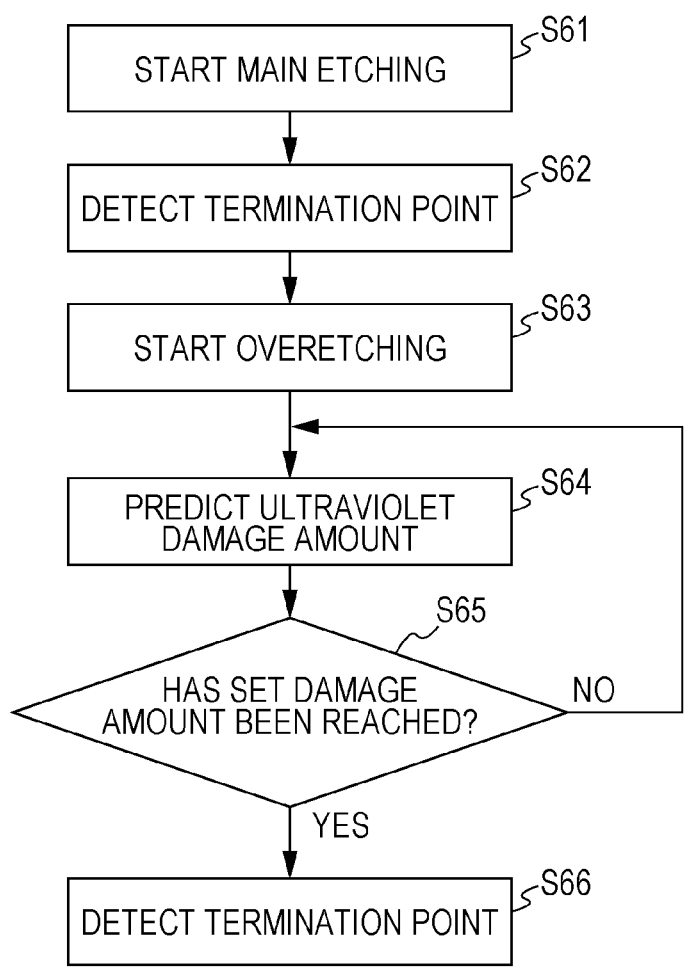
FIG. 14 is a flowchart for detecting an end of overetching by a dry etching apparatus according to fifth and tenth embodiments.

The dry etching apparatus according to the embodiment detects the termination point of overetching based on the flowchart shown in FIG. 14, for example.

In Step S61, the dry etching apparatus starts main etching as shown in FIG. 14.

While the main etching proceeds, the dry etching apparatus detects a termination point of the main etching in Step S62.

The termination point of the main etching can be detected by monitoring emission in the visible wavelength region by the aforementioned OES, for example.

After detecting the termination point of the main etching, the dry etching apparatus starts overetching in Step S63.

Next, in Step S64, the dry etching apparatus predicts a damage amount due to the ultraviolet rays. The prediction of the damage amount is performed based on the simulation flow shown in FIG. 1.

Then, in Step S65, the dry etching apparatus determines whether or not a preset damage amount has been achieved.

When the set damage amount has been achieved, the processing proceeds to Step S66, and the dry etching apparatus detects a termination point of the overetching.

When the set damage amount has not been achieved, the processing returns to Step S64, and the dry etching apparatus continues the overetching. Then, the dry etching apparatus predicts a damage amount again.

As described above, the termination point of the overetching can be detected.

The flowchart for detecting the termination point of the overetching shown in FIG. 14 can be executed by the computer program (software) mounted on each of the simulators 14, 44, and 54 of the apparatuses shown in FIGS. 6, 10, and 12.

Here, a specific example of a case in which the detection of the termination point of the etching according to the embodiment is applied to etching in a manufacturing process of a semiconductor device will be shown.

In this specific example, a thickness of $SiO_2$ on a silicon substrate is 2 nm, a thickness of polysilicon provided thereon is 150 nm, a thickness of a resist mask formed thereon is 300 nm, and polysilicon is patterned in a pattern of a gate by etching using the resist mask. A line width of an initial resist mask is set to 100 nm.

In this specific example, an apparatus and process conditions used in the process will be shown below.
Processing Apparatus
CCP (Capacitive Coupled Plasma) dry etching apparatus
Frequency: upper part=60 MHz, lower part=13.56 MHz
Chamber Diameter: 100 cm
Gap between Upper and Lower Electrodes: 60 mm
Visible Light Monitoring Apparatus: OES
Process Conditions
Gas Type: $HBr/O_2$
Gas Flow Rate: 500 sccm/5 sccm
Pressure: 30 mTorr
Upper Application Power: 150 W
Lower Application Power: 60 W
Etching Time: main etching for 100 seconds+overetching The termination point of the main etching of polysilicon is performed in the same manner as that in the related art by the OES (wavelength band: 300 to 800 nm, wavelength resolution: 0.5 nm) using a variation in the emission intensity in the visible wavelength region as an index. In this specific example, emission of SiBr at a wavelength of 526 nm, for example, is used as an index.

In relation to the overetching, the termination point is detected when the amount of damage on the silicon substrate, which is predicted by ultraviolet damage simulation, exceeds an acceptable value (silicon crystalline defect density of $10^{17}$ $cm^3$, for example).

As representative spectrum wavelengths for deriving electron energy distribution, 484 nm (caused by CO radicals), 777 nm (caused by O radicals) and 656 nm (caused by H radicals), for example, can be used. However, the wavelengths are not limited thereto for higher intensity.

In so doing, it is possible to perform overetching on polysilicon while visualizing the amount of damage on the silicon substrate and to thereby reduce the damage on the silicon substrate.

According to the aforementioned method for the etching process of the embodiment, the termination point of the overetching is detected using a damage amount due to the ultraviolet rays as an index, and therefore, it is possible to perform a plasma process with less damage while checking the damage amount in real time.

The aforementioned etching method according to the fifth embodiment is not limited to gate etching and can be applied to etching on STI, a side wall, a contact hole, or the like by optimizing the process conditions and emission in the visible wavelength region to be referred during the process.

In addition, the etching method according to the fifth embodiment can be applied to detection of a termination point of overetching performed on other films such as an organic film and a compound semiconductor (GaN, SiGe, or the like).

In addition, the etching apparatus according to the third embodiment and the etching apparatus according to the fourth embodiment may be designed to perform the detection of a termination point according to the fifth embodiment.

The aforementioned embodiments are preferable modes of the present disclosure.

A technical scope of the present disclosure is not limited to the aforementioned embodiments and can be also applied to a wavelength region other than the ultraviolet rays. Furthermore, the present disclosure is not limited to dry etching and can be widely applied to a semiconductor manufacturing process and a semiconductor manufacturing apparatus using plasma.

The embodiments of the present disclosure can be also configured as follows.

(1) A simulation method for predicting a damage amount due to ultraviolet rays in manufacturing a semiconductor device, the method including: calculating particle density by performing simulation based on a differential equation for the particle density; calculating emission intensity at each wavelength in a visible wavelength region based on the calculated particle density; obtaining an electron energy distribution function by comparing the calculated emission intensity at each wavelength in the visible wavelength region with an actually detected emission spectrum in the visible wavelength region with reference to information on emission species and an emission wavelength in a target manufacturing process; predicting an emission spectrum in an ultraviolet wavelength region by calculating emission intensity at each wavelength in the ultraviolet wavelength region by using the electron energy distribution function and a reaction cross-sectional area relating to the emission species; and predicting the damage amount due to the ultraviolet rays based on the predicted emission spectrum in the ultraviolet wavelength region.

(2) The simulation method according to (1), wherein the damage amount due to the ultraviolet rays is predicted based on the predicted emission spectrum in the ultraviolet wavelength region and created pattern structure data.

(3) The simulation method according to (2), wherein a damage amount database in which a film material, an ultraviolet wavelength, a pattern structure, a dose amount of the ultraviolet rays, and process conditions are associated with the damage amount is created in advance, and cross-checking with the damage amount database is performed in predicting the damage amount due to the ultraviolet rays.

(4) A simulation program for predicting a damage amount due to ultraviolet rays in manufacturing a semiconductor device, the program causing an information processing apparatus to mount thereon and execute functions of: calculating particle density by performing simulation based on a differential equation for the particle density; calculating emission intensity at each wavelength in a visible wavelength region based on the calculated particle density; obtaining an electron energy distribution function by comparing the calculated emission intensity at each wavelength in the visible wavelength region with an actually detected emission spectrum in the visible wavelength region with reference to information on emission species and an emission wavelength in a target manufacturing process; predicting an emission spectrum in an ultraviolet wavelength region by calculating emission intensity at each wavelength in the ultraviolet wavelength region by using the electron energy distribution function and a reaction cross-sectional area relating to the emission species; and predicting the damage amount due to the ultraviolet rays based on the predicted emission spectrum in the ultraviolet wavelength region.

(5) A semiconductor manufacturing apparatus including: a chamber in which a wafer is disposed; a sensor which detects an emission spectrum in a visible wavelength region inside the chamber; a calculation unit which calculates particle density by performing simulation based on a differential equation for the particle density, calculates emission intensity at each wavelength in a visible wavelength region based on the calculated particle density, obtains an electron energy distribution function by comparing the calculated emission intensity at each wavelength in the visible wavelength region with an emission spectrum in the visible wavelength region, which has been actually detected with the sensor, with reference to information on emission species and an emission wavelength in a target manufacturing process, predicts an emission spectrum in an ultraviolet wavelength region by using the electron energy distribution function and a reaction cross-sectional area relating to the emission species, predicts a damage amount due to the ultraviolet rays based on the predicted emission spectrum in the ultraviolet wavelength region, and calculates process conditions inside the chamber so as to minimize the damage amount; and a control unit which controls process conditions inside the chamber so as to meet the process conditions which have been calculated by the calculation unit.

(6) The semiconductor manufacturing apparatus according to (5), wherein the calculation unit predicts a variation in a shape during a process by shape simulation after predicting the damage amount due to the ultraviolet rays and calculating the process conditions inside the chamber and calculates process conditions which are different from the previously calculated process conditions when the variation in the shape exceeds an acceptable range.

(7) The semiconductor manufacturing apparatus according to (5) or (6), wherein the calculation unit further detects a termination point of overetching after main etching when the predicted damage amount due to the ultraviolet rays reaches a preset damage amount.

Hereinafter, description will be given of best modes (hereinafter, referred to as embodiments) for carrying out the embodiments of the present disclosure.

In addition, the description will be given in the following order.

1. Outline of the Present Disclosure
2. Sixth Embodiment (Simulation Method)
3. Seventh Embodiment (Simulator)
4. Eighth Embodiment (Dry Etching Apparatus)
5. Ninth Embodiment (Dry Etching Apparatus)
6. Tenth Embodiment (Dry Etching Apparatus and Method for Etching Process)
1. Outline of the Present Disclosure First, description will be given of an outline of the present disclosure prior to description of specific embodiments.

According to an embodiment of the present disclosure, an ultraviolet emission spectrum is predicted by simulation based on data on a visible emission spectrum without directly monitoring ultraviolet light emission.

In addition, the amount of damage to a film is predicted using a result of prediction of the ultraviolet emission spectrum by the simulation as input information.

Moreover, a semiconductor manufacturing apparatus with software based on the aforementioned prediction method installed thereon is configured for the purpose of reducing damage due to the ultraviolet rays in real time.

Principle

First, description will be given of a principle used in the embodiment of the present disclosure.

Ultraviolet emission and visible emission (shift in vibration and rotation, electron shift accompanying with fine structure shift or ultra-fine structure shift) from atoms and molecules are variations (electron displacement) in states of electrons which are present between energy bands and can be generally expressed as the following Equations.

$$\frac{d[x]_\lambda}{dt} = \sum_{\lambda'} n_e [x]_{\lambda'} <\sigma_{\lambda'} v> - \sum_{\lambda'} A_{\lambda'} [x]_{\lambda'}$$

$$I_\lambda = A_\lambda [x]_\lambda h v_\lambda \beta \left(\frac{S-P}{S}\right)$$

where ne represents electron density, σλ represents a reaction cross-sectional area, Aλ represents an A coefficient of Einstein in the respective shift, [x]λ represents a population in each level, Iλ represents intensity of light at a wavelength λ, h represents a Planck constant, vλ represents a corresponding frequency, β represents an escape ratio, S represents a source function, and P represents a background function.

As shown in the equations, the emission intensity I depends on contribution of other levels, and therefore, there is more or less correlation.

According to the embodiments of the present disclosure, ultraviolet emission intensity and damage are predicted by using the correlativity in the visible wavelength region and the ultraviolet wavelength region as a principle.

According to the embodiments of the present disclosure, a simulation method, a simulation program, and a semiconductor manufacturing apparatus are configured as follows by using the aforementioned principle.

The simulation method according to an embodiment of the present disclosure is a simulation method for predicting a damage amount due to the ultraviolet rays in manufacturing a semiconductor device.

An equation for predicting emission intensity at each wavelength in the ultraviolet wavelength region, which has been associated with an emission spectrum in the visible wavelength region, is calculated by multivariable analysis, and an emission spectrum in the ultraviolet wavelength region is predicted by using the calculated predicting equation and an actually detected emission spectrum in the visible wavelength region. Furthermore, a damage amount due to the ultraviolet rays is calculated based on the predicted emission spectrum in the ultraviolet wavelength region.

The simulation program according to an embodiment of the present disclosure is a simulation program for predicting a damage amount due to the ultraviolet rays in manufacturing a semiconductor device.

First, an equation for predicting emission intensity at each wavelength in the ultraviolet wavelength region, which has been associated with an emission spectrum in the visible wavelength region, is calculated by multivariable analysis. Then, an emission spectrum in the ultraviolet wavelength region is predicted by using the calculated predicting equation and an actually detected emission spectrum in the visible wavelength region. Furthermore, a damage amount due to the ultraviolet rays is predicted based on the predicted emission spectrum in the ultraviolet wavelength region.

Moreover, an information processing apparatus mounts on the above functions and is caused to execute the functions.

The semiconductor manufacturing apparatus according to an embodiment of the present disclosure includes a chamber with a wafer disposed therein, a sensor which detects an emission spectrum in the visible wavelength region in the chamber, a calculation unit which calculates process conditions in the chamber, and a control unit which controls the process conditions in the chamber.

The calculation unit predicts an emission spectrum in the ultraviolet wavelength region by using the equation for predicting emission intensity at each wavelength in the ultraviolet wavelength region, which has been calculated by the multivariable analysis in association with an emission spectrum in the visible wavelength region, and an emission spectrum in the visible wavelength region, which has been actually detected by the sensor. Then, the calculation unit predicts a damage amount due to the ultraviolet rays from the predicted emission spectrum in the ultraviolet rays and calculates the process conditions in the chamber so as to minimize the damage amount.

The control unit controls the process conditions in the chamber so as to satisfy the process condition calculated by the calculation unit.

Simulation Method

Next, the simulation method according to the embodiment of the present disclosure will be described in detail.

Figure 15:
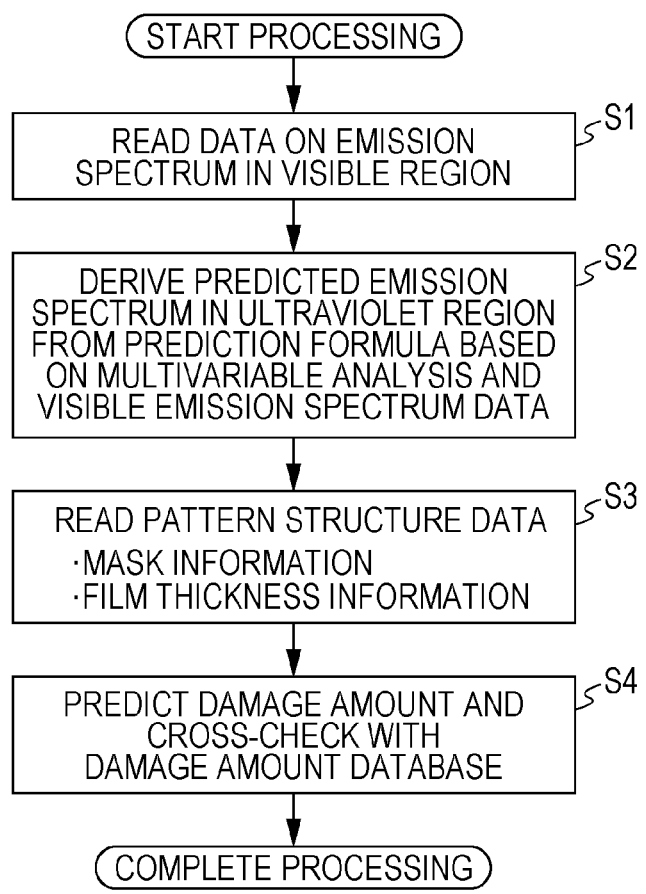
FIG. 15 is a basic flow diagram of a simulation method according to an embodiment of the present disclosure.

FIG. 15 is a basic flow diagram for the simulation method according to the embodiment of the present disclosure.

The flow shown in FIG. 15 is executed by a simulator (an information processing apparatus, a calculation unit) which will be described later in detail.

First, in Step S1, the simulator reads data on an emission spectrum in the visible wavelength region (300 nm to 800 nm, for example; this region will be referred to as a region A) as input data as shown in FIG. 15. The data on the emission spectrum in the visible wavelength region is data on an emission spectrum in the visible wavelength region, which has been actually emitted in the chamber of the semiconductor manufacturing apparatus (a processing apparatus or the like) and detected with the sensor such as an OES (Optical Emission Spectrometer).

Next, in Step S2, the simulator quantitatively predicts an emission spectrum in the ultraviolet wavelength region (10 nm to 300 nm, for example; this region will be referred to as a region B) by applying the read data on the emission spectrum in the visible wavelength region to the predicting equation based on the multivariable analysis, which has been obtained in advance.

Then, in Step 3, the simulator reads pattern structure data, namely information on a pattern structure as a target to be irradiated with the ultraviolet rays. As pattern structure data, the simulator reads mask information (GDS file information, for example) and film thickness information.

Next, in Step S4, the simulator predicts a damage amount. In this occasion, the simulator cross-checks the emission spectrum in the ultraviolet wavelength region which has been predicted in Step S2 and the read pattern structure data with a damage amount database to thereby predict a damage amount.

Furthermore, each step in the flow in FIG. 15 will be described in detail.

The quantitative prediction of the emission spectrum in the ultraviolet wavelength region in Step S2 in FIG. 15 can be performed as will be described below, for example.

Figure 16:
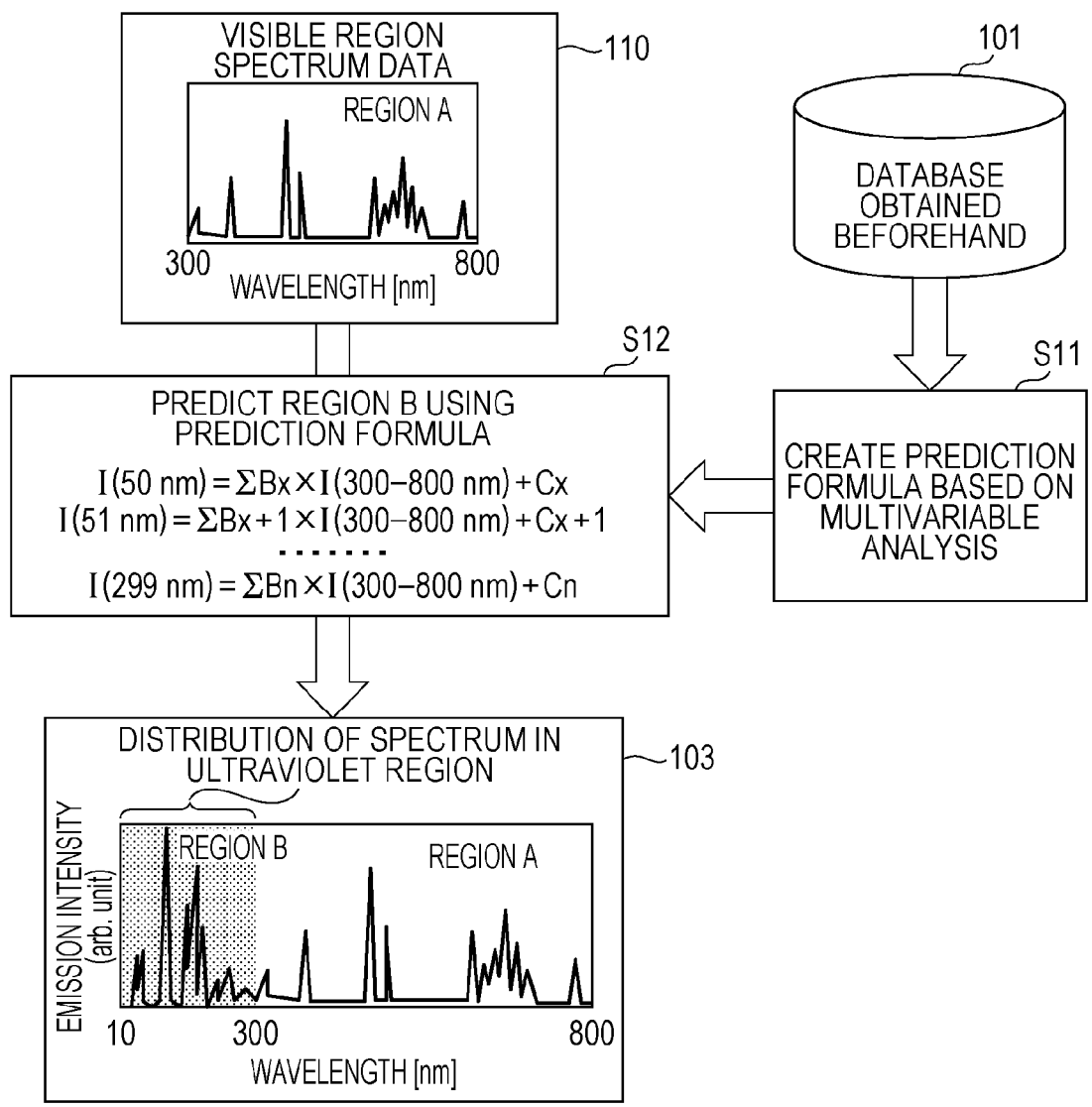
FIG. 16 is a flow diagram of simulation for quantitatively predicting an emission spectrum in an ultraviolet wavelength region.

FIG. 16 is a flow diagram of the simulation for the quantitative prediction of the emission spectrum in the ultraviolet wavelength region.

The flow shown in FIG. 16 is also executed by the simulator (the information processing apparatus, the calculation unit) which will be described later in detail.

The spectrum data in the visible wavelength region and the ultraviolet wavelength region is obtained beforehand for various process conditions such as a process for silicon, a process for $SiO_2$, a process for SiN, a process for an organic film, a process for a compound semiconductor, and a process for metal and conditions of a processing apparatus to construct database 101. Examples of the processing apparatus include a CCP (Capacitive Coupled Plasma) apparatus, an ICP (Inductively Coupled Plasma) apparatus, an ECR (Electron Cyclotron Resonance) apparatus, and the like.

Figure 17:
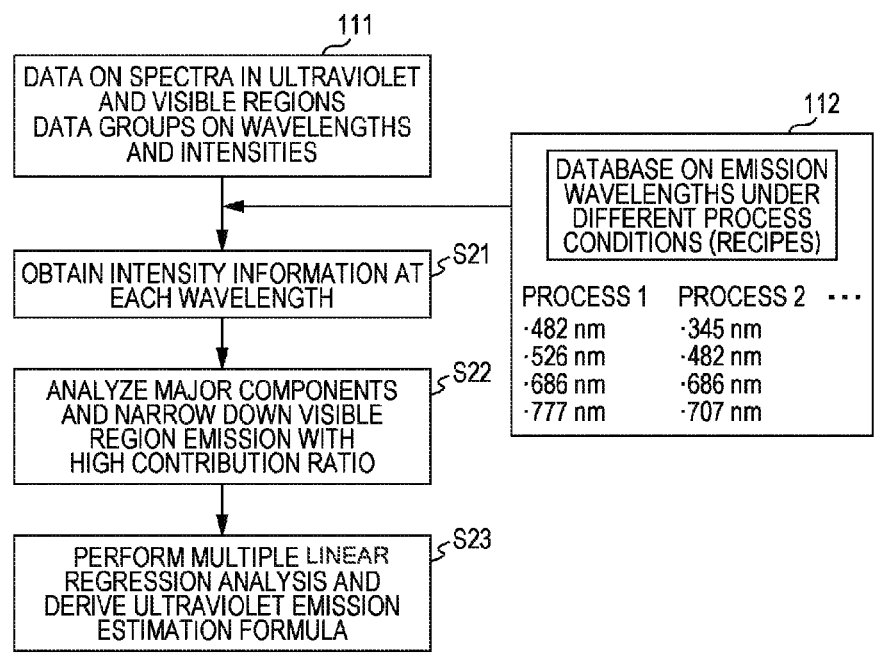
FIG. 17 is a flow diagram for creating a predicting equation in a multivariable analysis.

Next, in Step S11, the simulator creates the predicting equation based on the multivariable analysis by using the data in the database 101. FIG. 17 is a flow diagram for creating the predicting equation.

The flow shown in FIG. 17 is also executed by the simulator (the information processing apparatus, the calculation unit) which will be described later in detail.

As shown in FIG. 17, spectrum data 111 in the ultraviolet wavelength region and the visible wavelength region, which contains a data group of wavelengths and intensity, is prepared in advance.

Then, in Step S21 in FIG. 17, the simulator identifies emission species and a wavelength group relating to the visible emission form process conditions (recipe information) 112 and extracts and obtains information on emission intensity at each wavelength from the spectrum data 111.

Moreover, in Step S22 in FIG. 17, the simulator performs main component analysis by using the obtained information on intensity at each wavelength and selects wavelength intensity with a higher degree of contribution, which is derived by the main component analysis. Specifically, the simulator selects top m items of wavelength intensity in terms of a contribution ratio until a cumulative contribution ratio Pm represented by the following equation reaches (but not exclusive to) 80%, for example, on this occasion.

$$P_m = \frac{\sum_{j=1}^{m} \lambda_j}{tr(V)}$$

where a matrix V represents a covariance matrix represented by the following equation, λj represents a j-th largest unique value in the covariance matrix V, and tr(V) represents sum of unique values of V.

$$V = \frac{1}{N-1} X^T X$$

$$X = \begin{pmatrix} x_{11} & x_{12} & \cdots & x_{1P} \\ x_{21} & x_{22} & \cdots & x_{2P} \\ \vdots & \vdots & \vdots & \vdots \\ x_{N1} & x_{N2} & \cdots & x_{NP} \end{pmatrix}$$

where N represents a number of samples, and xNP represents visible emission intensity at each wavelength.

Furthermore, in Step S23 in FIG. 17, the simulator performs multiple linear regression analysis to derive an equation for predicting ultraviolet emission.

Specifically, the simulator sets a fitting mode represented by the following equation by using the visible emission data items, the number of which has been reduced to some degree by the main component analysis in Step S22, and performs the multiple linear regression analysis on this occasion. Then, the simulator obtains Bj and Ci in the equation by the multiple linear regression analysis and derives a final equation Ii for predicting emission intensity at a wavelength i in the ultraviolet wavelength region. Although a stepwise method is used, for example, as the multiple linear regression analysis, the multiple linear regression analysis is not limited thereto.

$$I_i = \sum_{j=1}^{m} B_j x_j + C_i$$

As described above, the predicting equation in Step S11 in FIG. 17 can be created.

Next, in Step S12 in FIG. 16, the simulator predicts a spectrum in the ultraviolet wavelength region (region B) by using data 110 on a separately measured spectrum in the visible wavelength region and the predicting equation which has been created in Step S11. Intensity at each wavelength in the ultraviolet wavelength region is predicted as I (50 nm)=ΣBx×I (300 to 800 nm)+Cx, I (51 nm)=ΣBx+1×I (300 to 800 nm)+Cx+1, ..., I (299 nm)=ΣBn×I (300 to 800 nm)+Cn, for example.

In so doing, emission spectrum distribution 103 in the ultraviolet wavelength region and the visible wavelength region, which includes the predicted spectrum distribution in the ultraviolet wavelength region (region B), is obtained.

In the prediction of a damage amount in Step S4 in FIG. 15, a damage amount database is used. The damage amount database includes combinations of damage amount (crystalline defect) data and each data item on a pattern structure, a dose amount, and process conditions (a gas type, a flow rate, pressure, power) at each specific wavelength for each film type (Si, $SiO_2$, SiN, an organic film, a compound).

FIG. 5 shows an outline of a part of the damage amount database. FIG. 5 shows combinations of damage amount data and data on the pattern structures, dose amounts, and process conditions at each of specific wavelengths 1, 2, and 3 for Si and the organic film.

Although FIG. 5 shows a pair of combination between the damage amount data and the data on the pattern structure, the dose amount, and the process conditions for the wavelength 1, there are multiple combinations for each of the wavelengths 1, 2, and 3 in an actual damage amount database.

The damage amount database may be created by actually performing measurement in advance or may be created by numerical value simulation or the like using MD (Molecular Dynamics) or the like.

With the use of the damage amount database configured as shown in FIG. 5, it is possible to associate a wavelength and intensity of the ultraviolet rays with process conditions, a pattern structure, and an aperture ratio and to thereby predict a damage amount.

In so doing, it is possible to quantitatively optimize the process conditions and the device structure (or a pattern layout), which minimize damage due to the ultraviolet rays, based on the predicted damage amount.

Then, the simulator cross-checks the emission spectrum in the ultraviolet wavelength region, which has been obtained in Step S12 in FIG. 16, and the information on an actual pattern structure of ultraviolet irradiation, which has been read in Step S3, with the damage amount database as shown in FIG. 5 and performs spline interpolation. As described above, a damage amount due to the ultraviolet rays is predicted.

A damage amount due to the ultraviolet rays is predicted as described above, and the processing shown in FIG. 15 is then completed.

According to the aforementioned simulation method of the embodiment of the present disclosure, the equation for predicting emission intensity at each wavelength in the ultraviolet wavelength region is calculated by the multivariable analysis. Then, the calculated predicting equation and an emission spectrum in the visible wavelength region, which has been actually detected with the sensor, are used to predict an emission spectrum in the ultraviolet wavelength region. In so doing, it is possible to precisely predict an emission spectrum in the ultraviolet wavelength region.

Moreover, since a damage amount due to the ultraviolet rays is predicted based on the predicted emission spectrum in the ultraviolet wavelength region, it is possible to precisely predict the emission intensity and the damage amount due to the ultraviolet rays in accordance with a wavelength of the ultraviolet rays emitted during the process.

Semiconductor Manufacturing Apparatus

Figure 18:
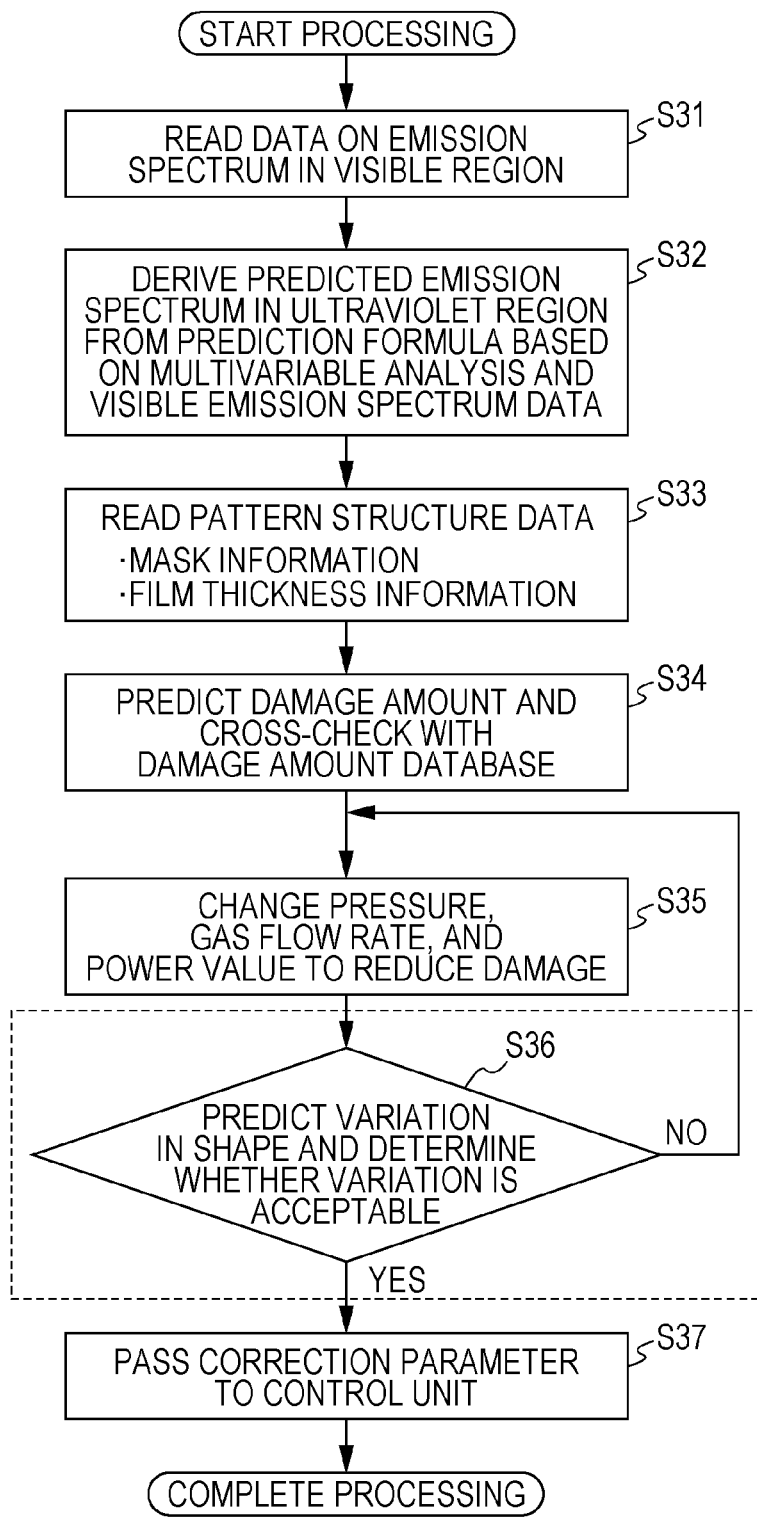
FIG. 18 is a flowchart for correcting conditions for a manufacturing process by the semiconductor manufacturing apparatus in FIG. 6.

FIG. 6 is a conceptual diagram of a semiconductor manufacturing apparatus according to an embodiment of the present disclosure. In addition, FIG. 18 is a flowchart for a process correcting operation by the semiconductor manufacturing apparatus according to the embodiment of the present disclosure.

A semiconductor manufacturing apparatus 1 shown in FIG. 6 includes a plasma chamber 2, an OES as a monitor for emission in the visible wavelength region, a simulator 4 with a simulation program (software) for executing simulation mounted thereon, and a control unit 5. The simulator 4 is an information processing apparatus such as a computer and corresponds to the "calculation unit" according to the embodiment of the present disclosure.

An electrode 13 is provided at a lower part in the plasma chamber 2. A wafer 6 is subjected to film formation and film processing while being placed on the electrode 13.

Although not shown in the drawing, an electrode (upper electrode) is provided even at an upper part in the plasma chamber 2, and the film formation and the film processing are performed on the wafer 6 in a state in which plasma is generated by generating an electric field between the electrode (lower electrode) 13 and the upper electrode.

The simulation program (software) to be mounted on the simulator 4 is configured to be operable on-line and/or off-line.

In addition, the simulator 4 performs an operation for predicting a spectrum in the ultraviolet wavelength region from monitoring data obtained by the OES, predicting a damage amount, and searching optimized process conditions as shown in the right drawing in FIG. 6.

In addition, the simulation program (software) to be mounted on the simulator 4 may be configured to search the optimized process conditions by further performing shape variation prediction surrounded by a broken line after the prediction of a damage amount.

The control unit 5 performs control so as to provide feedback of the corrected process conditions for the plasma chamber 2, which have been obtained in the simulation executed by the simulator 4, to the plasma chamber 2.

In addition, it is also possible to employ a configuration other than the OES shown in FIG. 6 as the monitor for emission in the visible wavelength region.

Moreover, the semiconductor manufacturing apparatus 1 shown in FIG. 6 corrects conditions for the manufacturing process based on the flowchart shown in FIG. 18, for example.

First, in Step S31, the OES provided in the plasma chamber 2 subsequently obtains data on an emission spectrum in the visible wavelength region (wavelength from 300 to 800 nm, for example) during the plasma process as shown in FIG. 18.

Then, in Step S32, the simulator 4 predicts an emission spectrum in the ultraviolet wavelength region based on the aforementioned predicting equation based on the multivariable analysis and data on an emission spectrum in the visible wavelength region, which has been obtained by the OES.

Next, in Step S33, the simulator 4 reads data on a pattern structure as a target of ultraviolet irradiation (mask information, film thickness information, and the like).

Then, in Step S34, the simulator 4 predicts a damage amount due to the ultraviolet rays by the aforementioned simulation method. Here, the simulator 4 cross-checks the emission spectrum in the ultraviolet wavelength region, which has been predicted in Step S32, and the read pattern structure data with the damage amount database to thereby predict a damage amount.

Next, in Step S35, the simulator 4 selects process conditions (pressure, a flow rate, power), which reduce damage within a range near recipe conditions (±50%, for example), from the damage amount database.

When the shape variation prediction surrounded by broken lines in FIGS. 6 and 18 is not performed, the processing directly proceeds to Step S37, and the simulator 4 passes a correction parameter under the selected process conditions to the control unit 5.

On the other hand, when the shape variation prediction surrounded by the broken lines in FIGS. 6 and 18 is performed, the processing proceeds from Step S35 to Step S36, and the simulator 4 performs the shape variation prediction. Specifically, the simulator 4 predicts a variation in the shape by performing shape simulation by using the selected process conditions, a wafer aperture ratio, a semi-local aperture ratio, and a pattern structure. For the shape simulation, a method disclosed in Japanese Unexamined Patent Application Publication No. 2009-152269, for example, can be employed.

When the variation is within an acceptable range (within ±10%, for example) as a result of the prediction, the processing proceeds to Step S37, and the simulator 4 passes the correction parameter under the selected process conditions to the control unit 5.

On the other hand, when the variation exceeds the acceptable range, the processing returns to Step S35, and the simulator 4 selects process conditions, under which damage can be reduced, which are different from the previously selected process conditions. Then, the processing proceeds to Step S36, and the simulator 4 performs the shape variation prediction under the selected process conditions.

The simulator 4 repeats the above steps to search a shape which meets a specification and optimized process conditions under which a damage amount due to the ultraviolet rays can be reduced.

When the process conditions are determined, the simulator 4 passes the determined process conditions to the side of the plasma chamber 2 through the control unit 5 and corrects the process conditions in real time.

Since the semiconductor manufacturing apparatus according to the embodiment of the present disclosure predicts an ultraviolet spectrum by using the information on emission in the visible wavelength region, which reflects a plasma state and a chamber wall state during the processing, as described above, it is possible to more precisely control a damage amount due to the ultraviolet rays as compared with methods in the related art. Thus, it is possible to enhance an electric characteristic of a semiconductor device, namely a transistor I-V characteristic, white spot and dark current of an imager, conversion efficiency of a solar cell, a laser output characteristic, and the like.

In addition, it is possible to further optimize the process conditions when the shape variation prediction is also performed.

The semiconductor manufacturing apparatus according to the embodiment of the present disclosure can employ processing such as dry etching, CVD (Chemical Vapor Deposition), and PVD (Physical Vapor Deposition) regardless of the type of processing as long as plasma is used.

2. Sixth Embodiment (Simulation Method)

Next, specific embodiments will be described.

First, description will be given of a simulation method according to a sixth embodiment.

In the simulation method according to the embodiment, monitoring data by the OES is used to perform simulation of an ultraviolet emission spectrum and a damage amount.

FIG. 8 is a pattern structure diagram used in the simulation method according to the embodiment.

The pattern structure shown in FIG. 8 includes layers from a photodiode PD of a back irradiation type image sensor (pixel size of 1.5 μm) to an OCL (On Chip Lens).

The thickness of the photodiode PD is 3000 nm, the thickness of an inter-layer film 21 provided thereon is 1500 nm, the thickness of a color filter 22 for three colors R, G, and B provided thereon is 700 nm, and the thickness of the OCL 23 provided thereon is 700 nm.

FIG. 8 is a conceptual diagram showing a state in which vacuum ultraviolet VUV generated during dry etching performed on the OCL 23 is attenuated and transmitted through the OCL 23, the color filter 22, and the inter-layer film 21 and damages the photodiode PD in manufacturing such a pattern structure. Here, the vacuum ultraviolet VUV is at a wavelength from 10 to 200 nm.

According to the embodiment, the amount of damage given by the vacuum ultraviolet VUV to the photodiode PD in this state is predicted by simulation.

Structure information of a processing apparatus and process conditions used in processing the OCL 23 will be shown below.

Processing Apparatus

CCP (Capacitive Coupled Plasma) dry etching apparatus
Frequency: upper part=60 MHz, lower part=2 MHz
Chamber Diameter: 100 cm
Gap between Upper and Lower Electrodes: 40 mm
Visible Light Monitoring Apparatus: OES Process Conditions Gas Type: CF4
Gas Flow Rate: 150 sccm
Pressure: 60 mTorr
Upper Application Power: 1000 W
Etching Time: 15 minutes The OES (wavelength band: 200 to 800 nm, wavelength resolution: 0.5 nm) as the visible light monitoring apparatus is installed with a port of a chamber wall of the processing apparatus (a material for a window is sapphire, for example) in between.

The OES subsequently obtains data on an emission spectrum emitted from plasma during the etching.

According to the embodiment, information on the aforementioned processing apparatus, structure information (the layer thickness of each of the OCL 23, the color filter 22, and the inter-layer film 21), information on the aforementioned process conditions, and visible emission spectrum information obtained by the OES are used as input information.

Then, such input information and the method for predicting a damage amount according to the embodiment of the present disclosure shown in FIG. 15 are used, and the predicting equation based on the multivariable analysis is created based on FIG. 17 from a database on emission under process conditions (recipe) for a CF4 gas process. In so doing, it is possible to predict a spectrum in the ultraviolet wavelength region at a wavelength of not longer than 200 nm and an amount of crystalline defects in silicone formed in a surface layer of the photodiode PD by simulation according to the embodiment.

According to the aforementioned simulation method of the embodiment, the equation for predicting emission intensity at each wavelength in the ultraviolet wavelength region is calculated based on the multivariable analysis. Then, an emission spectrum in the ultraviolet wavelength region is predicted by using the calculated predicting equation and the emission spectrum in the visible wavelength region, which has been actually obtained by the OES, as input information, and a damage amount due to the ultraviolet rays is predicted from the predicted emission spectrum in the ultraviolet wavelength region. In so doing, it is possible to precisely predict emission intensity and a damage amount due to the ultraviolet rays in accordance with the wavelength of the ultraviolet rays emitted during the process.

Although the technique of the present disclosure was applied to the CCP dry etching apparatus in the embodiment, the simulation method according to the embodiment of the present disclosure may be applied to any processing apparatus such as an ICP (Inductive Coupled Plasma) apparatus or an ECR (Electron Cyclotron Resonance) apparatus regardless of the type.

In addition, the processing process to which the simulation method according to the embodiment of the present disclosure is applied may be performed on a transistor, STI (Shallow Trench Isolation), a side wall, a contact hole, or the like regardless of the type as well as the dry etching performed on the OCL 23 with the pattern structure shown in FIG. 8.

Furthermore, the process conditions to which the simulation method according to the embodiment of the present disclosure is applied is also not particularly limited as long as a target film can be processed.

3. Seventh Embodiment (Simulator)

Next, description will be given of a simulator according to a seventh embodiment.

A simulator (an information processing apparatus, a calculation unit) according to the embodiment mounts thereon a computer program (software), which is caused to execute a simulation function for predicting a damage amount according to the embodiment of the present disclosure, and executes the simulation method of the embodiment of the present disclosure.

FIG. 9 is a conceptual diagram of the simulator according to the seventh embodiment.

A simulator 30 shown in FIG. 9 includes an input unit 31, an ultraviolet spectrum computation unit 32, a database 33 on wavelengths of emission under different process conditions, a damage amount computation unit 34, a damage amount database 35, and an output unit 36.

The simulator 30 exchanges signals and data with a processing apparatus 40 such as an etching apparatus.

In addition, processing proceeds in an order shown by arrows in FIG. 9 in the simulator 30.

Various kinds of data DATA is input to the input unit 31 as input information.

Examples of the various kinds of data DATA include pattern structure data (GDS data, for example), film thickness data, an apparatus parameter, a process parameter, a visible emission spectrum data, and the like.

The ultraviolet spectrum computation unit 32 uses the data DATA input to the input unit 31, obtains corresponding wavelength data with reference to the database 33 on wavelengths of emission under different process conditions based on the data DATA, and performs computation for obtaining an emission spectrum in the ultraviolet wavelength region. The database 33 on the wavelengths of emission under different process conditions contains a group of wavelengths for each process condition as data as shown in FIG. 17.

The damage amount computation unit 34 uses the emission spectrum in the ultraviolet wavelength region, which has been obtained by the ultraviolet spectrum computation unit 32, and performs computation for obtaining a damage amount with reference to the damage amount database 35 based on the emission spectrum in the ultraviolet wavelength region and the input data DATA.

The output unit 36 outputs the obtained damage amount from the simulator 30 to the outside.

The computer program (software) to be mounted on the simulator according to the embodiment is preferably configured to execute data input and calculation and to display a process of the calculation and a result thereof in response to operations performed on a GUI (graphical user interface). Although a GUI constructed by tcl/tk, Motif, or the like can be employed as the GUI, the embodiment of the present disclosure is not limited thereto.

In addition, an operation platform for the computer program (software) to be mounted on the simulator according to the embodiment can be applied to various OSs (Operation Systems) regardless of the type thereof.

Furthermore, the computer program (software) to be mounted on the simulator according to the embodiment may be operated off-line or may be connected with the simulator 30 on-line.

4. Eighth Embodiment (Dry Etching Apparatus)

Next, description will be given of a dry etching apparatus according to an eighth embodiment.

The dry etching apparatus according to the embodiment is configured to automatically control the process conditions so as to optimize a damage amount due to the ultraviolet rays.

FIG. 10 is an outlined configuration diagram (block diagram) of the dry etching apparatus according to the eighth embodiment.

The dry etching apparatus 41 shown in FIG. 10 includes a plasma chamber 42, an OES, a simulator 44 with a simulation program (software) for executing simulation mounted thereon, and a control unit 45. The simulator 44 is an information processing apparatus such as a computer and corresponds to the "calculation unit" according to the embodiment of the present disclosure.

An electrode 43 is provided at a lower part in the plasma chamber 42. A wafer 46 is subjected to an etching process while being placed on the electrode 43.

Although not shown in the drawing, an electrode (upper electrode) is provided even at an upper part in the plasma chamber 42, and the etching process is performed on the wafer 46 in a state in which plasma is generated by generating an electric field between the electrode (lower electrode) 43 and the upper electrode.

The OES is installed with a port window of the wall of the plasma chamber 42 in between.

The OES can be configured to have waveform resolution of 0.5 nm and a wavelength band from 300 nm to 800 nm, for example.

Conditions for etching by the dry etching apparatus 41 according to the embodiment may be set such that a frequency of the upper electrode is 60 MHz, a frequency of the lower electrode is 13.56 MHz, a diameter of the plasma chamber 42 is 100 cm, and a gap between the upper and lower electrodes is 40 mm, for example.

The simulation program (software) to be mounted on the simulator 44 is configured to be operable on-line and/or off-line.

In addition, the simulator 44 executes an operation for predicting a spectrum in the ultraviolet wavelength region from the monitoring data obtained by the OES, predicting a damage amount, and searching optimized process conditions as shown in the right drawing in FIG. 10.

The control unit 45 performs control so as to provide feedback of the corrected process conditions for the plasma chamber 42, which have been obtained by the simulation, to the plasma chamber 42.

In addition, it is also possible to employ a configuration other than the OES shown in FIG. 10 as a monitor for emission in the visible wavelength region.

Figure 19:
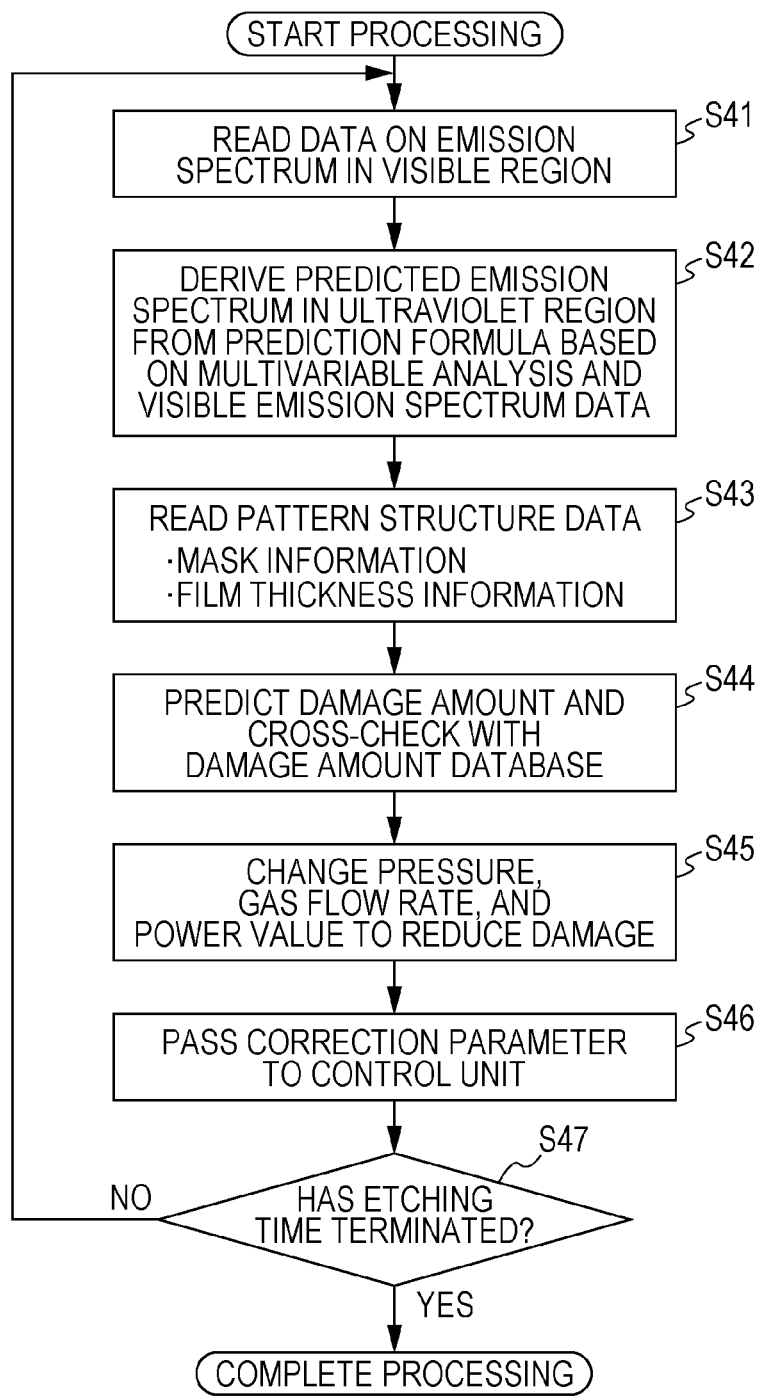
FIG. 19 is a flowchart for correcting conditions for a manufacturing process by the dry etching apparatus in FIG. 10.

The dry etching apparatus 41 shown in FIG. 10 corrects conditions for the manufacturing process based on the flowchart shown in FIG. 19, for example.

First, in Step S41, the OES provided in the plasma chamber 42 obtains data on an emission spectrum in the visible wavelength region (wavelength from 300 to 800 nm, for example) for every one second, for example, during the dry etching process as shown in FIG. 19.

Then, in Step S42, the simulator 44 predicts an emission spectrum in the ultraviolet wavelength region based on the aforementioned predicting equation based on the multivariable analysis and the data on the emission spectrum in the visible wavelength region, which has been obtained by the OES.

Next, in Step S43, the simulator 44 reads data on a pattern structure (mask information, film thickness information, and the like) as a target of ultraviolet irradiation.

Then, in Step S44, the simulator 44 predicts a damage amount due to the ultraviolet rays by the aforementioned simulation method. Here, the simulator 44 cross-checks the predicted emission spectrum in the ultraviolet wavelength region and the read pattern structure data with the damage amount database to predict the damage amount.

Next, in Step S45, the simulator 44 selects process conditions (pressure, a flow rate, power), under which damage is reduced within a range near recipe conditions (±50%, for example), from the damage amount database.

Then, in Step S46, the simulator 44 passes a correction parameter under the selected process conditions to the control unit 45.

By subsequently repeating the above steps until the completion of the etching, it is possible to perform dry etching while reducing a damage amount due to the ultraviolet rays.

Then, in Step S47, the simulator 44 determines whether or not etching time has passed.

When the etching time has passed, the etching processing is completed.

When the etching time has not passed, the processing returns to Step S41, and the OES obtains data on an emission spectrum in the visible wavelength region.

As described above, the dry etching can be performed while a damage amount due to the ultraviolet rays is reduced.

In the embodiment, any of a CCP apparatus, an ICP apparatus, and an ECR apparatus can be used as the dry etching apparatus.

In addition, the embodiment can be also applied to a semiconductor processing apparatus using plasma, such as a CVD (Chemical Vapor Deposition) apparatus or a PVD (Physical Vapor Deposition) apparatus.

According to the dry etching apparatus 41 according to the aforementioned embodiment, the simulator 44 predicts an emission spectrum in the ultraviolet wavelength region and a damage amount and selects process conditions for optimizing the damage amount. Then, the control unit 45 performs control so as to provide feedback of the corrected process conditions for the plasma chamber 42, which have been obtained by the simulation, to the plasma chamber 42.

In so doing, the process conditions for the process chamber 42 are controlled so as to optimize (minimize) the damage amount, and therefore, it is possible to reduce the damage amount due to the ultraviolet rays during the dry etching.

Accordingly, it is possible to manufacture a semiconductor device, which exhibits a satisfactory characteristic, with less damage due to the ultraviolet rays during the dry etching.

5. Ninth Embodiment (Dry Etching Apparatus)

Next, description will be given of a dry etching apparatus according to a ninth embodiment.

The dry etching apparatus according to the embodiment is configured to automatically control process conditions so as to optimize a damage amount due to the ultraviolet rays while a variation in shape is also taken into consideration.

FIG. 12 is an outlined configuration diagram (block diagram) of the dry etching apparatus according to the ninth embodiment.

A dry etching apparatus 51 shown in FIG. 12 includes a plasma chamber 52, an OES, a simulator 54 with a simulation program (software) for executing simulation mounted thereon, and a control unit 55. The simulator 54 is an information processing apparatus such as a computer and corresponds to the "calculation unit" according to the embodiment of the present disclosure.

An electrode 53 is provided at a lower part in the plasma chamber 52. A wafer 56 is subjected to the etching process while being placed on the electrode 53.

Although not shown in the drawing, an electrode (upper electrode) is provided even at an upper part in the plasma chamber 52, and the etching process is performed on the wafer 56 in a state in which plasma is generated by generating an electric field between the electrode (lower electrode) 53 and the upper electrode.

The OES is installed with a port window of the wall of the plasma chamber 52 in between.

The OES can be configured to have waveform resolution of 0.5 nm and a wavelength band from 300 nm to 800 nm, for example.

In the dry etching apparatus 51 according to the embodiment, conditions for etching is set such that a frequency of the upper electrode is 60 MHz, a frequency of the lower electrode is 13.56 MHz, a diameter of the plasma chamber 52 is 100 cm, and a gap between the upper and lower electrodes is 40 mm, for example.

The simulation program (software) to be mounted on the simulator 54 is configured to be operable on-line and/or off-line.

In addition, the simulator 54 executes an operation for predicting a spectrum in the ultraviolet wavelength region from the monitoring data obtained by the OES and predicting a damage amount as shown in the right drawing in FIG. 12.

The simulator 54 further executes an operation for predicting a variation in the shape and searching optimized process conditions after the prediction of the damage amount.

The control unit 55 performs control so as to provide feedback of the corrected process condition for the plasma chamber 52, which have been obtained by the simulation, to the plasma chamber 52.

In addition, a configuration other than the OES shown in FIG. 12 can be employed as a monitor for emission in the visible wavelength region.

Figure 20:
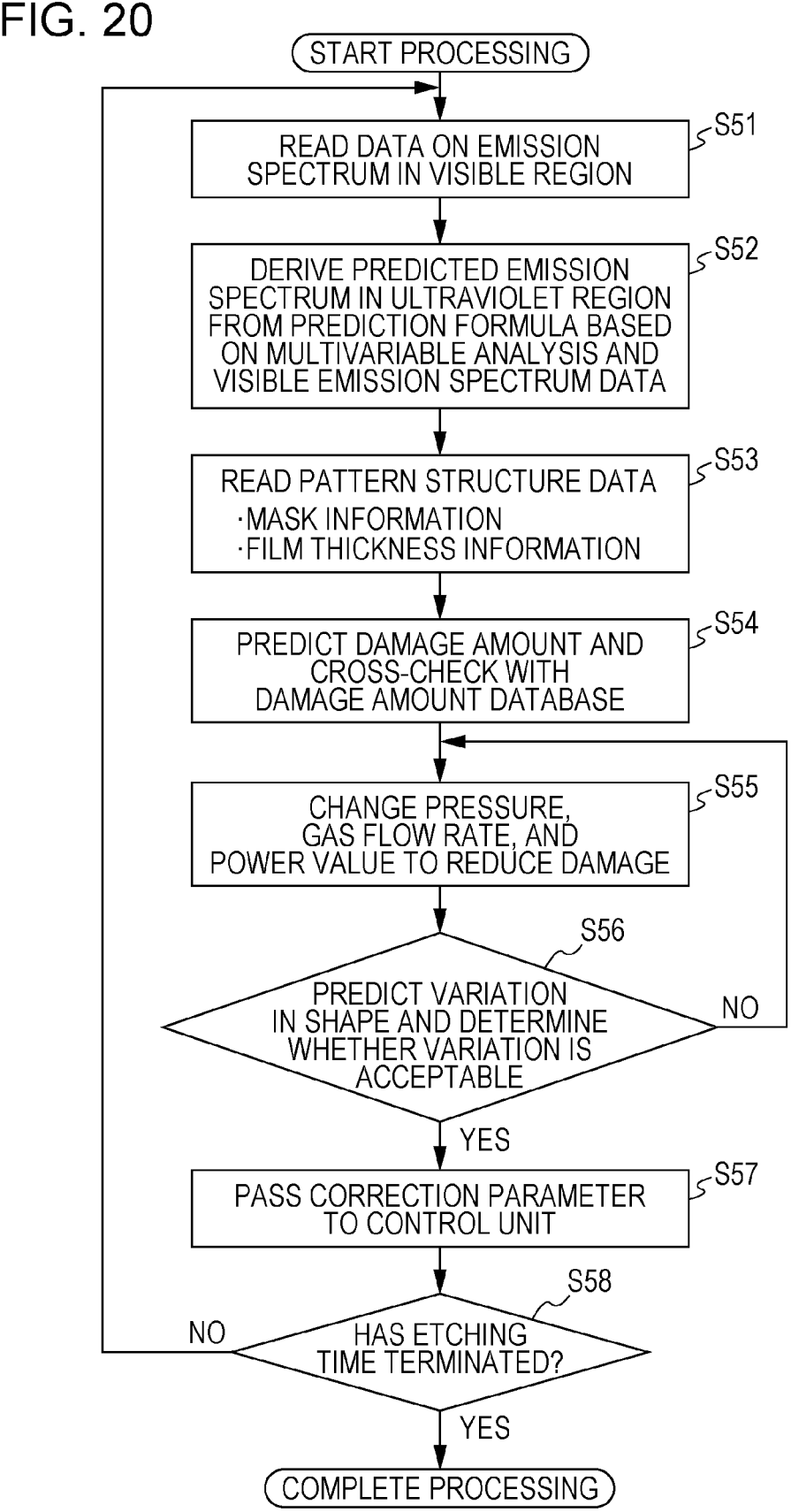
FIG. 20 is a flowchart for correcting conditions for a manufacturing process by the dry etching apparatus in FIG. 12.

Moreover, the dry etching apparatus 51 shown in FIG. 12 corrects conditions for the manufacturing process based on the flowchart shown in FIG. 20, for example.

First, in Step S51, the OES provided in the plasma chamber 52 obtains data on an emission spectrum in the visible wavelength region (wavelength from 300 to 800 nm, for example) for every one second, for example, during the dry etching as shown in FIG. 20.

Next, in Step S52, the simulator 54 predicts an emission spectrum in the ultraviolet wavelength region based on the aforementioned predicting equation based on the multivariable analysis and the data on the emission spectrum in the visible wavelength region, which has been obtained by the OES.

Then, in Step S53, the simulator 54 reads data on a pattern structure (mask information, film thickness information, and the like) as a target of the ultraviolet irradiation.

Next, in Step S54, the simulator 54 predicts a damage amount due to the ultraviolet rays by the aforementioned simulation method. Here, the simulator 54 cross-checks the predicting equation based on the multivariable analysis and the read pattern structure data with the damage amount database to predict a damage amount.

Then, in Step S55, the simulator 54 selects process conditions (pressure, a flow rate, power), under which damage is reduced within a range near recipe conditions (±50%, for example), from the damage amount database.

Next, the processing proceeds to Step S56, and the simulator 54 performs shape variation prediction. Specifically, the simulator 54 predicts a variation in the shape by performing shape simulation by using the selected process conditions, a wafer aperture ratio, a semi-local aperture ratio, and a pattern structure. In addition, the semi-local aperture ratio is an aperture ratio of a resist mask in a region of several tens mm around a focused pattern (30 mm, for example; this value differs depending on the process conditions and is a value which is several times as large as a mean free path of the particle).

For the shape simulation, a method disclosed in Japanese Unexamined Patent Application Publication No. 2009-152269, for example, can be employed.

When the variation in the shape is within an acceptable range as a result of the prediction, the processing proceeds to Step S57, and the simulator 54 passes a correction parameter under the selected process conditions to the control unit 55.

On the other hand, when the variation in the shape exceeds the acceptable range, the processing returns to Step S55, and the simulator 54 selects process conditions, under which damage can be reduced, which are different from the previously selected process conditions. Then, the processing proceeds to Step S56, and the simulator 54 performs the shape variation prediction under the selected process conditions.

When the process conditions are determined, the simulator 54 sends the determined process conditions to the side of the plasma chamber 52 through the control unit 55 and corrects the process conditions in real time.

By subsequently repeating the above steps until the completion of the etching, it is possible to control the shape which meets a specification and reduce a damage amount due to the ultraviolet rays.

Next, in Step S58, the simulator 54 determines whether or not the etching time has passed.

When the etching time has passed, the etching processing is completed.

When the etching time has not passed, the processing returns to Step S51, and the OES obtains data on an emission spectrum in the visible wavelength region.

As described above, it is possible to perform dry etching while suppressing a variation in the shape and reducing a damage amount due to the ultraviolet rays.

In the embodiment, any of a CCP apparatus, an ICP apparatus, and an ECR apparatus can be used as the dry etching apparatus.

In addition, the embodiment can be also applied to a semiconductor processing apparatus using plasma, such as a CVD (Chemical Vapor Deposition) apparatus or a PVD (Physical Vapor Deposition) apparatus.

In the dry etching apparatus 51 according to the aforementioned embodiment, the simulator 54 predicts an emission spectrum in the ultraviolet wavelength region and a damage amount and selects process conditions for optimizing the damage amount. In addition, the control unit 55 performs control so as to provide feedback of the corrected process conditions for the plasma chamber 52, which have been obtained by the simulation, to the plasma chamber 52.

In so doing, the process conditions for the process chamber 52 are controlled so as to optimize (minimize) a damage amount, and therefore, it is possible to reduce the damage amount due to the ultraviolet rays during the dry etching.

Accordingly, it is possible to manufacture a semiconductor device, which exhibits a satisfactory characteristic, with less damage due to the ultraviolet rays during the dry etching.

According to the dry etching apparatus 51 of the aforementioned embodiment, the simulator 54 further predicts a variation in the shape between the prediction of the emission spectrum in the ultraviolet wavelength region and the prediction of the damage amount.

For this reason, it is possible to stably manufacture at a high yield a semiconductor device, which exhibits a satisfactory characteristic, with less variation in the shape during the etching.

6. Tenth Embodiment (Dry Etching Apparatus and Method for Etching Process)

Next, description will be given of a dry etching apparatus according to a tenth embodiment. In addition, a method for an etching process using the dry etching apparatus will be described.

The dry etching apparatus according to the embodiment is configured to control detection of a termination point of overetching by simulation of a damage amount.

Each part of the dry etching apparatus can be configured in the same manner as in the apparatuses shown in FIGS. 6, 10, and 12.

The dry etching apparatus according to the embodiment detects the termination point of overetching based on the flowchart shown in FIG. 14, for example.

In Step S61, the dry etching apparatus starts main etching as shown in FIG. 14.

While the main etching proceeds, the dry etching apparatus detects a termination point of the main etching in Step S62.

The termination point of the main etching can be detected by monitoring emission in the visible wavelength region by the aforementioned OES, for example.

After detecting the termination point of the main etching, the dry etching apparatus starts overetching in Step S63.

Next, in Step S64, the dry etching apparatus predicts a damage amount due to the ultraviolet rays. The prediction of the damage amount is performed based on the simulation flow shown in FIG. 15.

Then, in Step S65, the dry etching apparatus determines whether or not a preset damage amount has been achieved.

When the set damage amount has been achieved, the processing proceeds to Step S66, and the dry etching apparatus detects a termination point of the overetching.

When the set damage amount has not been achieved, the processing returns to Step S64, and the dry etching apparatus continues the overetching. Then, the dry etching apparatus predicts a damage amount again.

As described above, the termination point of the overetching can be detected.

The flowchart for detecting the termination point of the overetching shown in FIG. 14 can be executed by the computer program (software) mounted on each of the simulators 4, 44, and 54 of the apparatuses shown in FIGS. 19, 10, and 12.

Here, a specific example of a case in which the detection of the termination point of the etching according to the embodiment is applied to etching in a manufacturing process of a semiconductor device will be shown.

In this specific example, a thickness of $SiO_2$ on a silicon substrate is 2 nm, a thickness of polysilicon provided thereon is 150 nm, a thickness of a resist mask formed thereon is 300 nm, and polysilicon is patterned in a pattern of a gate by etching using the resist mask. A line width of an initial resist mask is set to 100 nm.

In this specific example, an apparatus and process conditions used in the process will be shown below.
Processing Apparatus
CCP (Capacitive Coupled Plasma) dry etching apparatus
Frequency: upper part=60 MHz, lower part=13.56 MHz
Chamber Diameter: 100 cm
Gap between Upper and Lower Electrodes: 60 mm
Visible Light Monitoring Apparatus: OES
Process Conditions
Gas Type: $HBr/O_2$
Gas Flow Rate: 500 sccm/5 sccm
Pressure: 30 mTorr
Upper Application Power: 150 W
Lower Application Power: 60 W
Etching Time: main etching for 100 seconds+overetching The termination point of the main etching of polysilicon is detected in the same manner as that in the related art by the OES (wavelength band: 300 to 800 nm, wavelength resolution: 0.5 nm) using a variation in the emission intensity in the visible wavelength region as an index. In this specific example, emission of SiBr at a wavelength of 526 nm, for example, is used as an index.

In relation to the overetching, the termination point is detected when the amount of damage on the silicon substrate, which is predicted by ultraviolet damage simulation, exceeds an acceptable value (silicon crystalline defect density of 1017 $cm^3$, for example).

In so doing, it is possible to perform overetching on polysilicon while visualizing the amount of damage on the silicon substrate and to thereby reduce the damage on the silicon substrate.

According to the aforementioned method for the etching process of the embodiment, the termination point of the overetching is detected using a damage amount due to the ultraviolet rays as an index, and therefore, it is possible to perform a plasma process with less damage while checking the damage amount in real time.

The aforementioned etching method according to the tenth embodiment is not limited to gate etching and can be applied to etching on STI, a side wall, a contact hole, or the like by optimizing the process conditions and emission in the visible wavelength region to be referred during the process.

In addition, the etching method according to the tenth embodiment can be applied to detection of a termination point of overetching performed on other films such as an organic film and a compound semiconductor (GaN, SiGe, or the like).

In addition, the etching apparatus according to the eighth embodiment and the etching apparatus according to the ninth embodiment may be designed to perform the detection of a termination point according to the tenth embodiment.

The aforementioned embodiments are preferable modes of the present disclosure.

A technical scope of the present disclosure is not limited to the aforementioned embodiments and can be also applied to a wavelength region other than the ultraviolet rays. Furthermore, the present disclosure is not limited to dry etching and can be widely applied to a semiconductor manufacturing process and a semiconductor manufacturing apparatus using plasma.

The embodiments of the present disclosure can be also configured as follows.

(1) A simulation method for predicting a damage amount due to ultraviolet rays in manufacturing a semiconductor device, the method including: calculating an equation for predicting emission intensity at each wavelength in an ultraviolet wavelength region, which has been associated with an emission spectrum in a visible wavelength region, based on multivariable analysis; predicting an emission spectrum in the ultraviolet wavelength region by using the calculated predicting equation and an actually detected emission spectrum in the visible wavelength region; and predicting the damage amount due to the ultraviolet rays based on the predicted emission spectrum in the ultraviolet wavelength region.

(2) The simulation method according to (1), wherein the damage amount due to the ultraviolet rays is predicted based on the predicted emission spectrum in the ultraviolet wavelength region and created pattern structure data.

(3) The simulation method according to (2), wherein a damage amount database in which a film material, an ultraviolet wavelength, a pattern structure, a dose amount of the ultraviolet rays, and process conditions are associated with the damage amount is created in advance, and cross-checking with the damage amount database is performed in predicting the damage amount due to the ultraviolet rays.

(4) A simulation program for predicting a damage amount due to ultraviolet rays in manufacturing a semiconductor device, the program causes an information processing apparatus to mount thereon and execute functions of: calculating an equation for predicting emission intensity at each wavelength in an ultraviolet wavelength region, which has been associated with an emission spectrum in a visible wavelength region, based on multivariable analysis; predicting an emission spectrum in the ultraviolet wavelength region by using the calculated predicting equation and an actually detected emission spectrum in the visible wavelength region; and predicting a damage amount due to the ultraviolet rays based on the predicted emission spectrum in the ultraviolet wavelength region.

(5) A semiconductor manufacturing apparatus including: a chamber in which a wafer is disposed; a sensor which detects an emission spectrum in a visible wavelength region inside the chamber; a calculation unit which predicts an emission spectrum in the ultraviolet wavelength region by using an equation for predicting emission intensity at each wavelength in the ultraviolet wavelength region, which has been calculated based on multivariable analysis in association with an emission spectrum in a visible wavelength region, and an emission spectrum in the visible wavelength region, which has been actually detected with the sensor, predicts a damage amount due to the ultraviolet rays based on the predicted emission spectrum in the ultraviolet wavelength region, and calculate process conditions inside the chamber so as to minimize the damage amount; and a control unit which controls process conditions inside the chamber so as to meet the process conditions which have been calculated by the calculation unit.

(6) The semiconductor manufacturing apparatus according to (5), wherein the calculation unit predicts a variation in a shape during a process by shape simulation after predicting the damage amount due to the ultraviolet rays and calculating the process conditions inside the chamber and calculates process conditions which are different from the previously calculated process conditions when the variation in the shape exceeds an acceptable range.

(7) The semiconductor manufacturing apparatus according to (5) or (6), wherein the calculation unit further detects a termination point of overetching after main etching when the predicted damage amount due to the ultraviolet rays reaches a preset damage amount.

The present disclosure contains subject matter related to that disclosed in Japanese Priority Patent Application JP 2011-262417 filed in the Japan Patent Office on Nov. 30, 2011 and Japanese Priority Patent Application JP 2011-262418 filed in the Japan Patent Office on Nov. 30, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A method for controlling a semiconductor manufacturing apparatus, the method comprising:
    detecting an emission spectrum of light in a visible wavelength region emitted in the semiconductor manufacturing apparatus;
    calculating particle density by performing simulation based on a differential equation for the particle density;
    calculating emission intensity at each wavelength in a visible wavelength region based on the calculated particle density;
    obtaining an electron energy distribution function by comparing the calculated emission intensity at each wavelength in the visible wavelength region with the detected emission spectrum with reference to information on emission species and an emission wavelength in a target manufacturing process;
    predicting an emission spectrum of light emitted in the semiconductor manufacturing apparatus in an ultraviolet wavelength region by calculating emission intensity at each wavelength in the ultraviolet wavelength region by using the electron energy distribution function and a reaction cross-sectional area relating to the emission species;
    predicting the damage amount due to the ultraviolet rays based on the predicted emission spectrum in the ultraviolet wavelength region; and
    controlling process conditions of the semiconductor manufacturing apparatus based on the predicted damage amount.

2. The method according to claim 1,
    wherein the damage amount due to the ultraviolet rays is predicted based on the predicted emission spectrum in the ultraviolet wavelength region and created pattern structure data.

3. The method according to claim 2,
    wherein a damage amount database in which a film material, an ultraviolet wavelength, a pattern structure, a dose amount of the ultraviolet rays, and process conditions are associated with the damage amount is created in advance, and cross-checking with the damage amount database is performed in predicting the damage amount due to the ultraviolet rays.

4. A non-transitory computer readable medium storing a program for controlling a semiconductor manufacturing apparatus, the program causing an information processing apparatus, when mounted thereon, to execute operations of:
    detecting an emission spectrum of light in a visible wavelength region emitted in the semiconductor manufacturing apparatus;
    calculating particle density by performing simulation based on a differential equation for the particle density;
    calculating emission intensity at each wavelength in a visible wavelength region based on the calculated particle density;
    obtaining an electron energy distribution function by comparing the calculated emission intensity at each wavelength in the visible wavelength region with the detected emission spectrum with reference to information on emission species and an emission wavelength in a target manufacturing process;
    predicting an emission spectrum of light emitted in the semiconductor manufacturing apparatus in an ultraviolet wavelength region by calculating emission intensity at each wavelength in the ultraviolet wavelength region by using the electron energy distribution function and a reaction cross-sectional area relating to the emission species;

predicting the damage amount due to the ultraviolet rays based on the predicted emission spectrum in the ultraviolet wavelength region; and controlling process conditions of the semiconductor manufacturing apparatus based on the predicted damage amount.

5. A semiconductor manufacturing apparatus comprising:
a chamber in which a wafer is disposed;
a sensor that detects an emission spectrum of light emitted in a visible wavelength region inside the chamber; and
a calculation unit that:
calculates particle density by performing simulation based on a differential equation for the particle density,
calculates emission intensity at each wavelength in the visible wavelength region based on the calculated particle density,
obtains an electron energy distribution function by comparing the calculated emission intensity at each wavelength in the visible wavelength region with the detected emission spectrum, with reference to information on emission species and an emission wavelength in a target, manufacturing process,
predicts an emission spectrum in an ultraviolet wavelength region by using the electron energy distribution function and a reaction cross-sectional area relating to the emission species,
predicts a damage amount due to the ultraviolet rays based on the predicted emission spectrum in the ultraviolet wavelength region, and
calculates target process conditions inside the chamber based on the damage amount,
wherein process conditions inside the chamber are set so as to meet the target process conditions that have been calculated by the calculation unit.

6. The semiconductor manufacturing apparatus according to claim 5,
wherein the calculation unit predicts a variation in a shape during a process by shape simulation after predicting the damage amount due to the ultraviolet rays and calculating the target process conditions inside the chamber and calculates updated target process conditions that are different from the previously calculated target process conditions when the variation in the shape exceeds a predetermined range.

7. The semiconductor manufacturing apparatus according to claim 5,
wherein the calculation unit further detects a termination point of overetching after main etching when the predicted damage amount due to the ultraviolet rays reaches a preset damage amount.

8. A method for controlling a semiconductor manufacturing device, the method comprising:
obtaining an equation for predicting emission intensity at each wavelength in an ultraviolet wavelength region that has been associated with an emission spectrum in a visible wavelength region, the equation having been calculated based on multivariable analysis;
detecting an emission spectrum of light emitted in the semiconductor manufacturing apparatus in the visible wavelength region;
predicting an emission spectrum of light emitted in the semiconductor manufacturing apparatus in the ultraviolet wavelength region by using the calculated predicting equation and the detected emission spectrum;
predicting the damage amount due to the ultraviolet rays based on the predicted emission spectrum in the ultraviolet wavelength region; and
controlling process conditions of the semiconductor manufacturing apparatus based on the predicted damage amount.

9. The method according to claim 8,
wherein the damage amount due to the ultraviolet rays is predicted based on the predicted emission spectrum in the ultraviolet wavelength region and created pattern structure data.

10. The method according to claim 9,
wherein a damage amount database in which a film material, an ultraviolet wavelength, a pattern structure, a dose amount of the ultraviolet rays, and process conditions are associated with the damage amount is created in advance, and cross-checking with the damage amount database is performed in predicting the damage amount due to the ultraviolet rays.

11. A non-transitory computer readable medium storing a program for controlling a semiconductor manufacturing device, the program causing an information processing apparatus, when mounted thereon, to execute operations of:
obtaining an equation tier predicting emission intensity at each wavelength in an ultraviolet wavelength region that has been associated with an emission spectrum in a visible wavelength region, the equation having been calculated based on multivariable analysis;
detecting an emission spectrum of light emitted in the semiconductor manufacturing apparatus in the visible wavelength region;
predicting an emission spectrum of light emitted in the semiconductor manufacturing apparatus in the ultraviolet wavelength region by using the calculated predicting equation and the detected emission spectrum; and
predicting a damage amount due to the ultraviolet rays based on the predicted emission spectrum in the ultraviolet wavelength region; and
controlling process conditions of the semiconductor manufacturing apparatus based on the predicted damage amount.

12. A semiconductor manufacturing apparatus comprising:
a chamber in which a wafer is disposed;
a sensor that detects an emission spectrum of light emitted in a visible wavelength region inside the chamber;
a calculation unit that:
obtains an equation for predicting emission intensity at each wavelength in an ultraviolet wavelength region that has been associated with an emission spectrum in a visible wavelength region, the equation having been calculated based on multivariable analysis;
predicts an emission spectrum in an ultraviolet wavelength region by using the equation and the detected emission spectrum,
predicts a damage amount due to the ultraviolet rays based on the predicted emission spectrum in the ultraviolet wavelength region, and
calculates target process conditions inside the chamber based on the damage amount; and
wherein process conditions inside the chamber are set so as to meet the target process conditions that have been calculated by the calculation unit.

13. The semiconductor manufacturing apparatus according to claim 12, wherein the calculation unit predicts a variation in a shape during a process by shape simulation after predicting the damage amount due to the ultraviolet rays and calculating the process conditions inside the chamber and calculates process conditions that are different from the previously calculated process conditions when the variation in the shape exceeds an acceptable range.

14. The semiconductor manufacturing apparatus according to claim 12,
wherein the calculation unit further detects a termination point of overetching after main etching when the predicted damage amount due to the ultraviolet rays reaches a preset damage amount.

* * * * *